United States Patent
Miyazaki et al.

(10) Patent No.: US 8,085,475 B2
(45) Date of Patent: Dec. 27, 2011

(54) ZOOM LENS SYSTEM, INTERCHANGEABLE LENS APPARATUS AND CAMERA SYSTEM

(75) Inventors: Kyoichi Miyazaki, Osaka (JP); Keiichi Zaitsu, Osaka (JP)

(73) Assignee: Panasonic Corporation, Osaka (JP)

( * ) Notice: Subject to any disclaimer, the term of this patent is extended or adjusted under 35 U.S.C. 154(b) by 206 days.

(21) Appl. No.: 12/696,546

(22) Filed: Jan. 29, 2010

(65) Prior Publication Data
US 2010/0195216 A1    Aug. 5, 2010

(30) Foreign Application Priority Data

Feb. 2, 2009    (JP) ................................ 2009-021834

(51) Int. Cl.
*G02B 15/14* (2006.01)
*H04N 5/225* (2006.01)
*G03B 13/00* (2006.01)
*H04N 5/232* (2006.01)

(52) U.S. Cl. ......... 359/680; 359/681; 348/340; 348/353

(58) Field of Classification Search .................. 348/340, 348/345, 353; 359/680, 681, 682
See application file for complete search history.

(56) References Cited

U.S. PATENT DOCUMENTS

| | | |
|---|---|---|
| 6,882,369 B1 | 4/2005 | Ito |
| 2004/0125462 A1 | 7/2004 | Misaka |
| 2005/0013015 A1 | 1/2005 | Sensui |
| 2005/0162541 A1 | 7/2005 | Ito |
| 2005/0219708 A1 | 10/2005 | Shibayama et al. |
| 2005/0275949 A1 | 12/2005 | Fujimoto et al. |
| 2006/0050406 A1 | 3/2006 | Ishii |
| 2006/0203356 A1 | 9/2006 | Fujimoto et al. |
| 2006/0215279 A1 | 9/2006 | Shibayama |
| 2006/0221464 A1 | 10/2006 | Shibayama et al. |
| 2007/0024985 A1 | 2/2007 | Misaka |
| 2007/0229974 A1 | 10/2007 | Shibayama et al. |
| 2007/0297067 A1 | 12/2007 | Muramatsu et al. |
| 2008/0055461 A1 | 3/2008 | Ito |
| 2008/0056699 A1 | 3/2008 | Ito |
| 2008/0144189 A1 | 6/2008 | Iwasawa et al. |
| 2008/0285146 A1 | 11/2008 | Shirasuna |
| 2010/0194930 A1* | 8/2010 | Miyazaki et al. .......... 348/240.3 |

FOREIGN PATENT DOCUMENTS

| | | |
|---|---|---|
| JP | 2000-111789 A | 4/2000 |
| JP | 2000-333064 A | 11/2000 |
| JP | 2001-004920 A | 1/2001 |
| JP | 2001-188171 A | 7/2001 |
| JP | 2004-198529 A | 7/2004 |

(Continued)

*Primary Examiner* — David N Spector
(74) *Attorney, Agent, or Firm* — Pearne & Gordon LLP

(57) ABSTRACT

Provided is a zoom lens system including a compact focusing lens unit and having a suppressed change in image magnification at the time of movement of the focusing lens unit. A zoom lens system of the present invention, in order from an object side to an image side, includes, a first lens unit G1 having negative optical power, a second lens unit G2 having positive optical power, a third lens unit G3 having positive optical power, and a fourth lens G4. Condition (10): $1.4<DL/YM<2.5$ and condition (11): $1.2<BF_W/YM<1.6$ are satisfied (where, $100<2\omega_W<140$, DL is an effective diameter of the lens surface closest to the image side, $BF_W$ is the back focus at a wide-angle limit, YM is the maximum image height at a wide-angle limit, and $\omega_W$ is a half view angle (°) at a wide-angle limit).

10 Claims, 13 Drawing Sheets

FOREIGN PATENT DOCUMENTS

| | | |
|---|---|---|
| JP | 2005-049843 A | 2/2005 |
| JP | 2005-284097 A | 10/2005 |
| JP | 2005-316396 A | 11/2005 |
| JP | 2005-352057 A | 12/2005 |
| JP | 2006-78535 A | 3/2006 |
| JP | 2006-221092 A | 8/2006 |
| JP | 2006-267425 A | 10/2006 |
| JP | 2007-219315 A | 8/2007 |
| JP | 2008-003195 A | 1/2008 |
| JP | 2008-015251 A | 1/2008 |
| JP | 2008-046208 A | 2/2008 |
| JP | 2008-145967 A | 6/2008 |
| JP | 2008-233284 A | 10/2008 |
| JP | 2008-281917 A | 11/2008 |

* cited by examiner

ZOOM LENS SYSTEM, INTERCHANGEABLE LENS APPARATUS AND CAMERA SYSTEM

CROSS-REFERENCE TO RELATED APPLICATION

This application is based on Japanese Patent Application No. 2009-021834 filed on Feb. 2, 2009. Hereby, the contents of Japanese Patent Application No. 2009-021834 are incorporated by reference.

BACKGROUND OF THE INVENTION

1. Field of the Invention

The present invention relates to a zoom lens system and, in particular, to a zoom lens system suitable for an imaging lens system employed in an interchangeable lens apparatus in a so-called interchangeable-lens type digital camera system. Further, the present invention relates to an interchangeable lens apparatus and a camera system that employ this zoom lens system.

2. Description of the Background Art

In recent years, interchangeable-lens type digital camera systems are rapidly spreading. The interchangeable-lens type digital camera system (also simply referred to as "camera system") is a camera system including: a camera body employing an image sensor composed of a CCD (Charge Coupled Device), a CMOS (Complementary Metal-Oxide Semiconductor), or the like; and an interchangeable lens apparatus employing an imaging lens system for forming an optical image on the light acceptance surface of the image sensor. Zoom lens systems applicable to the above interchangeable-lens type digital camera are disclosed in Japanese Laid-Open Patent Publication No. 2005-284097, Japanese Laid-Open Patent Publication No. 2005-352057, Japanese Laid-Open Patent Publication No. 2006-221092, Japanese Laid-Open Patent Publication No. 2005-316396, Japanese Laid-Open Patent Publication No. 2006-267425, Japanese Laid-Open Patent Publication No. 2007-219315, Japanese Laid-Open Patent Publication No. 2008-3195, and Japanese Laid-Open Patent Publication No. 2008-15251.

On the other hand, there are interchangeable-lens type digital camera systems employing a function of displaying image data generated by the imaging lens system or the image sensor on a display unit such as a liquid crystal display or the like of a camera body (hereinafter referred to as "live view function") (e.g., Japanese Laid-Open Patent Publication No. 2000-111789 and Japanese Laid-Open Patent Publication No. 2000-333064).

SUMMARY OF THE INVENTION

In the camera system disclosed in Japanese Laid-Open Patent Publication No. 2000-111789 and Japanese Laid-Open Patent Publication No. 2000-333064, when the live view function is being performed, a contrast AF method is employed to perform focusing operation. The contrast AF is the focusing operation based on the contrast value of image data obtained from the image sensor. Hereinafter, an operation of the contrast AF will be described.

First, the camera system oscillates the focusing lens unit in the optical axis direction at a high-speed (hereinafter referred to as "wobbling") thereby to detect the direction of displacement from an in-focus condition. After the wobbling, the camera system detects, from an output signal of the image sensor, signal components in a predetermined frequency band in an image region and calculates an optimal position of the focusing lens unit for realizing the in-focus condition. Thereafter, the camera system moves the focusing lens unit to the optimal position, and completes the focusing operation. When the focusing operation is performed continuously in video image taking or the like, the camera system repeats a series of the above operations.

Generally, in order that uneasiness such as flickers should be avoided, video displaying need be performed at a high rate of, for example, 30 frames per second. Thus, basically, video image taking using the interchangeable-lens type digital camera also need be performed at the same rate of 30 frames per second. Accordingly, the focusing lens unit need be driven at the high rate of 30 Hz at the time of wobbling.

However, if the weight of the focusing lens unit is large, a larger motor or actuator is required to move the focusing lens unit at a high rate. This causes a problem that the outer diameter of the lens barrel is increased. However, in the case of the zoom lens systems disclosed in the above conventional arts, the focusing lens unit is hardly light-weighted.

Further, in the interchangeable-lens type digital camera, it should be noted that the size of the image corresponding to a photographic object varies in association with wobbling. This variation in the image is caused mainly by the fact that the movement of the focusing lens unit in the optical axis direction generates a change in the focal length of the entire lens system. Then, when a large change in the image taking magnification is generated in association with wobbling, the image taking person will feel uneasiness.

An object of the present invention is to provide a zoom lens system which includes a compactly constructed focusing lens unit and which has a suppressed change in the image magnification at the time of movement of the focusing lens unit, and an interchangeable lens apparatus and a camera system which employ this zoom lens system.

A zoom lens system according to the present invention includes a plurality of lens units and performs zooming by changing intervals among the lens units. The plurality of lens units, in order from an object side to an image side, includes: a first lens unit having negative optical power; a second lens unit having positive optical power; a third lens unit having positive optical power; and a fourth lens. The following conditions are satisfied:

$$1.4 < DL/YM < 2.5 \qquad (10)$$

$$1.2 < BF_W/YM < 1.6 \qquad (11)$$

(where, $100 < 2\omega_W < 140$)

where,

DL is an effective diameter of the lens surface closest to the image side, $BF_W$ is the back focus at a wide-angle limit, YM is the maximum image height at a wide-angle limit, and $\omega_W$ is a half view angle (°) at a wide-angle limit.

An interchangeable lens apparatus according to the present invention includes: any of the above zoom lens system, and a mount section connected to a camera body that includes an image sensor which receives an optical image formed by the zoom lens system thereby to convert the optical image to an electrical image signal.

A camera system according to the present invention includes: an interchangeable lens apparatus that includes any of the above zoom lens system, and a camera body which is connected to the interchangeable lens apparatus via a camera mount section in an attachable and removable manner and includes an image sensor which receives an optical image formed by the zoom lens system thereby to convert the optical image to an electrical image signal.

According to the present invention, it is possible to provide a zoom lens system which includes a compactly constructed focusing lens unit and which has a suppressed change in image magnification at the time of movement of the focusing lens unit, and an interchangeable lens apparatus and a camera system which employ the zoom lens system.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
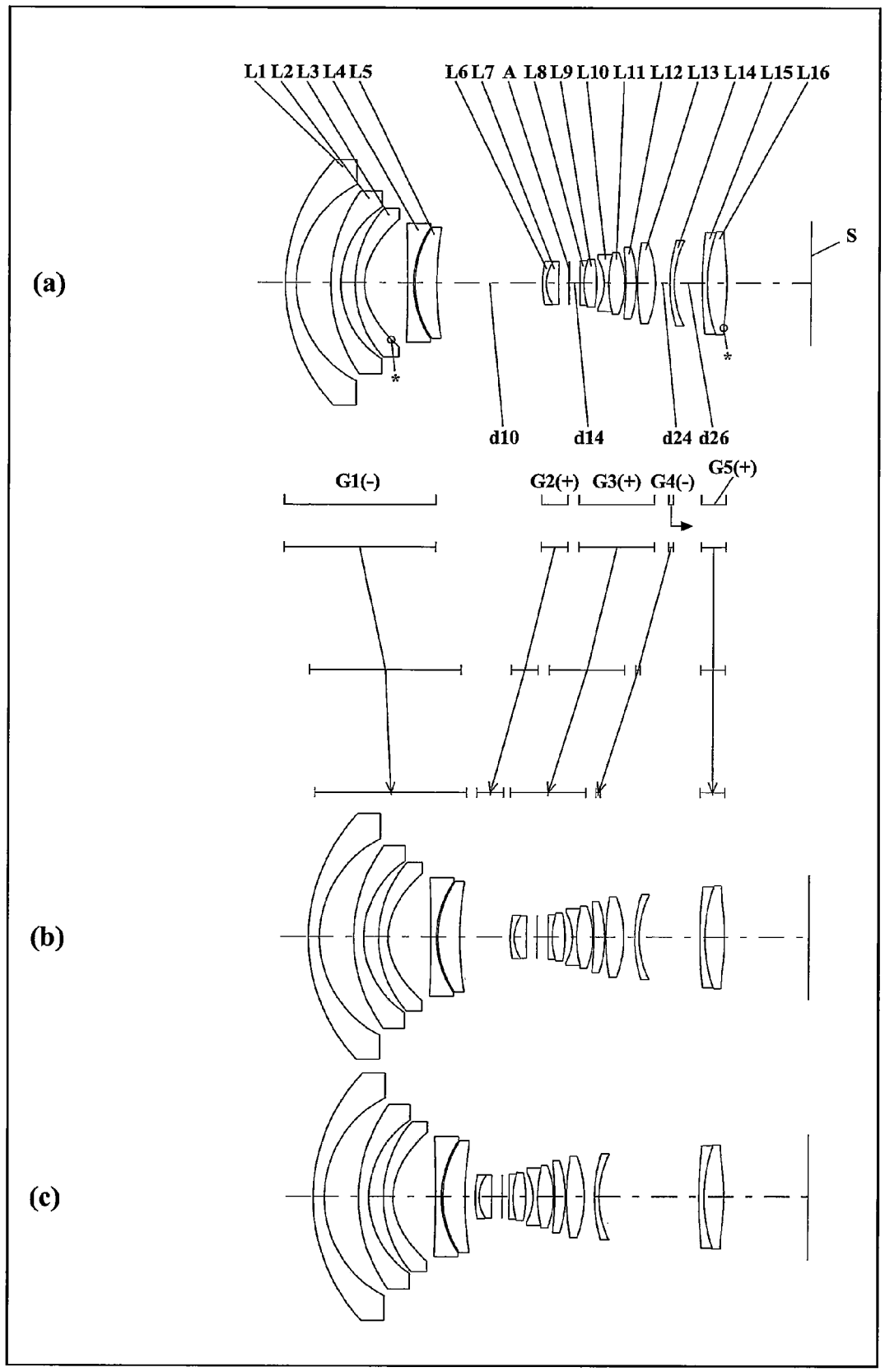
FIG. 1 is a lens arrangement diagram showing an infinity in-focus condition of a zoom lens system according to Embodiment 1 (Example 1)
Figure 2:
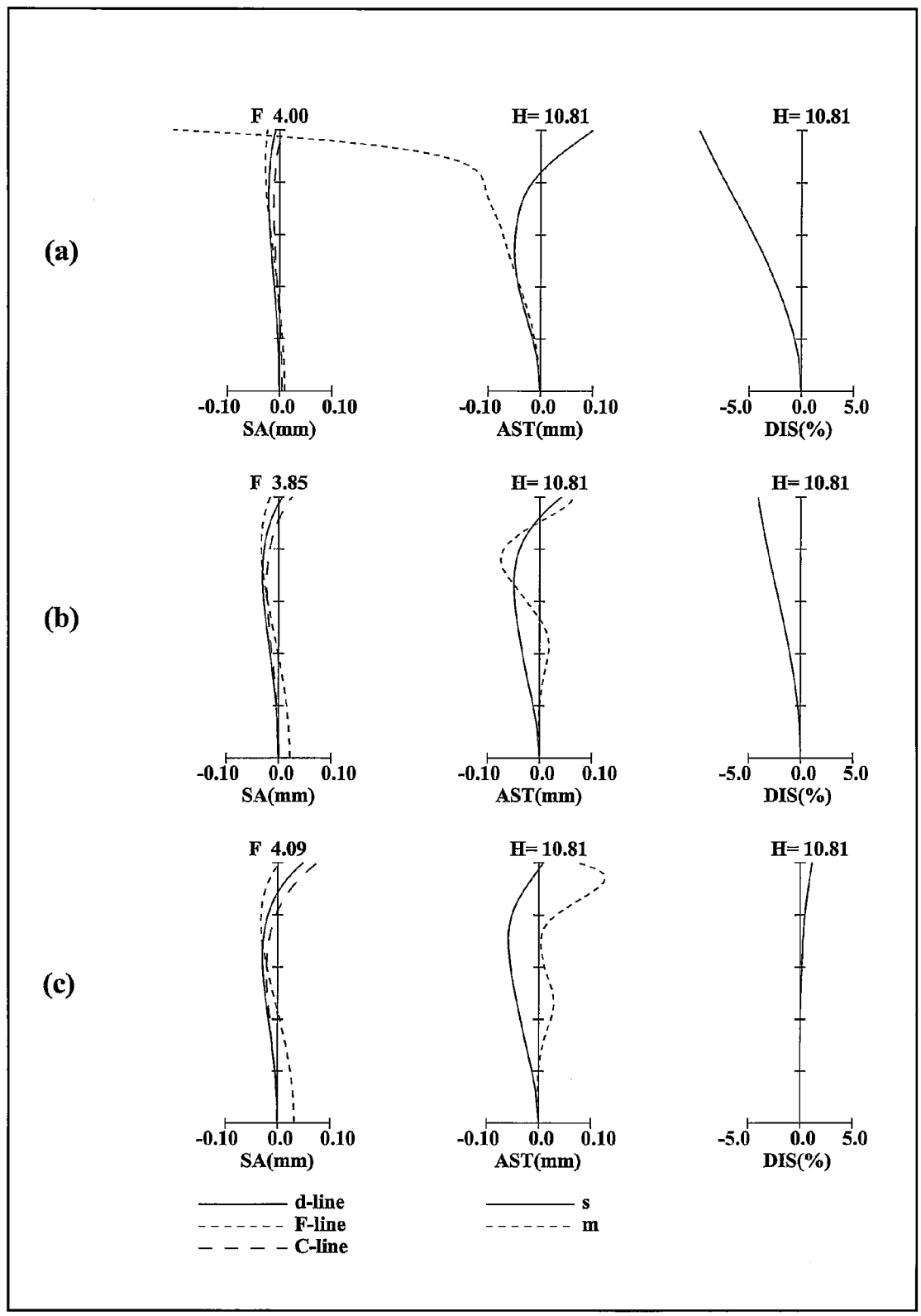
FIG. 2 is a longitudinal aberration diagram showing an infinity in-focus condition of a zoom lens system according to Example 1.

FIGS. 1, 3, 5, 7, 9, and 11 show lens arrangement diagrams of zoom lens systems according to Embodiments 1, 2, 3, 4, 5, and 6, respectively, and each show a zoom lens system in a infinity in-focus condition.

In each diagram, part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each diagram, each bend arrow located between part (a) and part (b) indicates a line obtained by connecting the positions of the lens units respectively at a wide-angle limit, a middle position, and a telephoto limit, in order from the top. In the part between the wide-angle limit and the middle position, and the part between the middle position and the telephoto limit, the positions are connected simply with a straight line, and hence this line does not indicate actual motion of each lens unit. Moreover, in each diagram, an arrow imparted to a lens unit indicates focusing from an infinity in-focus condition to a close-object in-focus condition. That is, the arrow indicates the moving direction at the time of focusing from an infinity in-focus condition to a close-object in-focus condition.

In FIGS. 1, 3, 5, 7, 9, and 11, asterisk "*" imparted to a particular surface indicates that the surface is aspheric. Further, in each diagram, symbol (+) or symbol (−) imparted to the symbol of each lens unit corresponds to the sign of the optical power of the lens unit. Still further, in each diagram, the straight line located on the most right-hand side indicates the position of the image surface S. Still further, in each diagram, the straight line located between adjoining lens elements indicates the position of an aperture diaphragm A.

Embodiment 1

The zoom lens system according to Embodiment 1, in order from the object side to the image side, includes a first lens unit G1 having negative optical power, a second lens unit G2 having positive optical power, a third lens unit G3 having positive optical power, a fourth lens unit G4 having negative optical power, and a fifth lens unit G5 having positive optical power.

The first lens unit G1, in order from the object side to the image side, includes: a negative meniscus first lens element L1 with the convex surface facing the object side; a negative meniscus second lens element L2 with the convex surface facing the object side; a negative meniscus third lens element L3 with the convex surface facing the object side; a bi-concave fourth lens element L4; and a positive meniscus fifth lens element L5 with the convex surface facing the object side. A surface of the third lens element L3 facing the image side is aspheric.

The second lens unit G2, in order from the object side to the image side, includes: a negative meniscus sixth lens element L6 with the convex surface facing the object side; and a positive meniscus seventh lens element L7 with the convex surface facing the object side. The sixth lens element L6 and the seventh lens element L7 are cemented with each other.

The third lens unit G3, in order from the object side to the image side, includes: a negative meniscus eighth lens element L8 with the convex surface facing the object side; a bi-convex ninth lens element L9; a bi-concave tenth lens element L10; a bi-convex eleventh lens element L11; a positive meniscus twelfth lens element L12 with the convex surface facing the image side; and a bi-convex thirteenth lens element L13. The eighth lens element L8 and the ninth lens element L9 are cemented with each other. In addition, the tenth lens element L10 and the eleventh lens element L11 are cemented with each other.

The fourth lens unit G4 consists of a negative meniscus fourteenth lens element L14 with the convex surface facing the object side.

The fifth lens unit G5, in order from the object side to the image side, includes: a negative meniscus fifteenth lens element L15 with the convex surface facing the object side; and a bi-convex sixteenth lens element L16. The fifteenth lens element L15 and the sixteenth lens element L16 are cement with each other. A surface of the sixteenth lens element L16 facing the image side is aspheric.

At the time of zooming, the plurality of lens units move along the optical axis such that: the interval between the first lens unit G1 and the second lens unit G2 at a telephoto limit is made shorter than the interval at a wide-angle limit; the interval between the second lens unit G2 and the third lens unit G3 at a telephoto limit is made shorter than the interval at a wide-angle limit; the interval between the third lens unit G3 and the fourth lens unit G4 at a telephoto limit is made shorter than the interval at a wide-angle limit; and the interval between the fourth lens unit G4 and the fifth lens unit G5 at a telephoto limit is made longer than the interval at a wide-angle limit. More specifically, at the time of zooming from a wide-angle limit to a telephoto limit, the first lens unit G1 moves to the image side along the optical axis, whereas the second lens unit G2, the third lens unit G3, and the fourth lens unit G4 move to the object side along the optical axis. The fifth lens unit G5 is fixed relative to the image surface S at the time of zooming. The aperture diaphragm A moves to the object side together with the second lens unit G2.

Further, at the time of focusing from an infinity in-focus condition to a close-point in-focus condition, the fourth lens unit G4 moves to the image side along the optical axis.

Embodiment 2

The zoom lens system according to Embodiment 2, in order from the object side to the image side, includes a first lens unit G1 having negative optical power, a second lens unit G2 having positive optical power, a third lens unit G3 having positive optical power, a fourth lens unit G4 having negative optical power, and a fifth lens unit G5 having positive optical power.

The first lens unit G1, in order from the object side to the image side, includes: a negative meniscus first lens element L1 with the convex surface facing the object side; a negative meniscus second lens element L2 with the convex surface facing the object side; a negative meniscus third lens element L3 with the convex surface facing the object side; a bi-concave fourth lens element L4; and a positive meniscus fifth lens element L5 with the convex surface facing the object side. The fourth lens element L4 and the fifth lens element L5 are cemented with each other. Further, a surface of the third lens element L3 facing the image side is aspheric.

The second lens unit G2, in order from the object side to the image side, includes: a negative meniscus sixth lens element L6 with the convex surface facing the object side; and a positive meniscus seventh lens element L7 with the convex surface facing the object side. The sixth lens element L6 and the seventh lens element L7 are cemented with each other.

The third lens unit G3, in order from the object side to the image side, includes: a negative meniscus eighth lens element L8 with the convex surface facing the object side; a bi-convex ninth lens element L9; a bi-concave tenth lens element L10, a bi-convex eleventh lens element L11, a positive meniscus twelfth lens element L12 with the convex surface facing the image side; and a bi-convex thirteenth lens element L13. The eighth lens element L8 and the ninth lens element L9 are cemented with each other. In addition, the tenth lens element L10 and the eleventh lens element L11 are cemented with each other.

The fourth lens unit G4 consists of a negative meniscus fourteenth lens element L14 with the convex surface facing the object side.

The fifth lens unit G5, in order from the object side to the image side, includes: a negative meniscus fifteenth lens element L15 with the convex surface facing the object side; and a bi-convex sixteenth lens element L16. The fifteenth lens element L15 and the sixteenth lens element L16 are cemented with each other. Further, a surface of the sixteenth lens element L16 facing the image side is aspheric.

At the time of zooming, the plurality of lens units move along the optical axis such that: the interval between the first lens unit G1 and the second lens unit G2 at a telephoto limit is made shorter than the interval at a wide-angle limit; the interval between the second lens unit G2 and the third lens unit G3 at a telephoto limit is made shorter than the interval at a wide-angle limit; the interval between the third lens unit G3 and the fourth lens unit G4 at a telephoto limit is made shorter than the interval at a wide-angle limit; and the interval between the fourth lens unit G4 and the fifth lens unit G5 at a telephoto limit is made longer than the interval in a wide-angle limit. More specifically, at the timing of zooming from a wide-angle limit to a telephoto limit, the first lens unit G1 moves to the image side along the optical axis, whereas the second lens unit G2, third lens unit G3, and the fourth lens unit G4 move to the object side along the optical axis. The fifth lens unit G5 is fixed relative to the image surface S at the time of zooming. The aperture diaphragm A moves to the object side together with the second lens unit G2.

Further, at the time of focusing from an infinity in-focus condition to a close-point in-focus condition, the fourth lens unit G4 moves to the image side along the optical axis.

Embodiment 3

The zoom lens system according to Embodiment 3, in order from the object side to the image side, includes: a first lens unit G1 having negative optical power, a second lens unit G2 having positive optical power, a third lens unit G3 having positive optical power, a fourth lens unit G4 having negative optical power, and a fifth lens unit G5 having positive optical power.

The first lens unit G1, in order from the object side to the image side, includes: a negative meniscus first lens element L1 with the convex surface facing the object side; a negative meniscus second lens element L2 with the convex surface facing the object side; a negative meniscus third lens element L3 with the convex surface facing the object side; a bi-concave fourth lens element L4; and a positive meniscus fifth lens element L5 with the convex surface facing the object side. The fourth lens element L4 and the fifth lens element L5 are cemented with each other. A surface of the third lens element L3 facing the image side is aspheric.

The second lens unit G2, in order from the object side to the image side, includes: a negative meniscus sixth lens element L6 with the convex surface facing the object side; and a positive meniscus seventh lens element L7 with the convex surface facing the object side. The sixth lens element L6 and the seventh lens element L7 are cemented with each other.

The third lens unit G3, in order from the object side to the image side, includes: a plano-concave eighth lens element L8 with the concave surface facing the image side; a bi-convex ninth lens element L9; a bi-concave tenth lens element L10; a bi-convex eleventh lens element L11; and a bi-convex twelfth lens element L12. The eighth lens element L8 and the ninth lens element L9 are cemented with each other. In addition, the tenth lens element L10 and the eleventh lens element L11 are cemented with each other.

The fourth lens unit G4 consists of a negative meniscus thirteenth lens element L13 with the convex surface facing the object side.

The fifth lens unit G5, in order from the object side to the image side, includes: a bi-concave fourteenth lens element L14; and a bi-convex fifteenth lens element L15. The fourteenth lens element L14 and the fifteenth lens element L15 are cemented with each other. Further, a surface of the fifteenth lens element L15 facing the image side is aspheric.

At the time of zooming, the plurality of lens units move along the optical axis such that: the interval between the first lens unit G1 and the second lens unit G2 at a telephoto limit is made shorter than the interval at a wide-angle limit; the interval between the second lens unit G2 and the third lens unit G3 at a telephoto limit hardly changes from the interval at a wide-angle limit; the interval between the third lens unit G3 and the fourth lens unit G4 at a telephoto limit is made shorter than the interval at a wide-angle limit; and the interval between the fourth lens unit G4 and the fifth lens unit G5 at a telephoto limit is made longer than the interval at a wide-angle limit. More specifically, at the time of zooming from a wide-angle limit to a telephoto limit, the first lens unit G1 moves to the image side along the optical axis, whereas the second lens unit G2, the third lens unit G3, and the fourth lens unit G4 move to the object side along the optical axis. The fifth lens unit G5 is fixed relative to the image surface S at the time of zooming. The aperture diaphragm A moves to the object side together with the second lens unit G2.

Further, at the time of focusing from an infinity in-focus condition to a close-point in-focus condition, the fourth lens unit G4 moves to the image side along the optical axis.

Embodiment 4

The zoom lens system according to Embodiment 4, in order from the object side to the image side, includes a first lens unit G1 having negative optical power, a second lens unit G2 having positive optical power, a third lens unit G3 having positive optical power, a fourth lens unit G4 having negative optical power, and a fifth lens unit G5 having positive optical power.

The first lens unit G1, in order from the object side to the image side, includes: a negative meniscus first lens element L1 with the convex surface facing the object side; a negative meniscus second lens element L2 with the convex surface facing the object side; a negative meniscus third lens element L3 with the convex surface facing the object side; an bi-concave fourth lens element L4; and a positive meniscus fifth lens element L5 with the convex surface facing the object side. The fourth lens element L4 and the fifth lens element L5 are cemented with each other. Further, a surface of the third lens element L3 facing the image side is aspheric.

The second lens unit G2, in order from the object side to the image side, includes: a negative meniscus sixth lens element L6 with the convex surface facing the object side; and a positive meniscus seventh lens element L7 with the convex surface facing the object side. The sixth lens element L6 and the seventh lens element L7 are cemented with each other. A surface of the seventh lens element L7 facing the image side is aspheric.

The third lens unit G3, in order from the object side to the image side, includes: a negative meniscus eighth lens element L8 with the convex surface facing the object side; a bi-convex ninth lens element L9; a bi-concave tenth lens element L10; a bi-convex eleventh lens element L11; and a bi-convex twelfth lens element L12. The eighth lens element L8 and the ninth lens element L9 are cemented with each other. In addition, the tenth lens element L10 and the eleventh lens element L11 are cemented with each other.

The fourth lens unit G4 consists of a negative meniscus thirteenth lens element L13 with the convex surface facing the object side.

The fifth lens unit G5, in order from the object side to the image side, includes: a bi-concave fourteenth lens element L14; and a bi-convex fifteenth lens element L15. The fourteenth lens element L14 and the fifteenth lens element L15 are cemented with each other. Further, a surface of the fifteenth lens element L15 facing the image side is aspheric.

At the time of zooming, the plurality of lens units move along the optical axis such that: the interval between the first lens unit G1 and the second lens unit G2 at a telephoto limit is made shorter than the interval at a wide-angle limit; the interval between the second lens unit G2 and the third lens unit G3 at a telephoto limit is made shorter than the interval at a wide-angle limit; the interval between the third lens unit G3 and the fourth lens unit G4 at a telephoto limit hardly changes from the interval at a wide-angle limit; and the interval between the fourth lens unit G4 and the fifth lens unit G5 at a telephoto limit is made longer than the interval at a wide-angle limit. More specifically, at the time of zooming from a wide-angle limit to a telephoto limit, the first lens unit G1 moves to the image side along the optical axis, whereas the second lens unit G2, the third lens unit G3, and the fourth lens unit G4 move to the object side along the optical axis. The fifth lens unit G5 is fixed relative to the image surface S at the time of zooming. The aperture diaphragm A moves to the object side together with the second lens unit G2.

Further, at the time of focusing from an infinity in-focus condition to a close-point in-focus condition, the fourth lens unit G4 moves to the image side along the optical axis.

Embodiment 5

The zoom lens system according to Embodiment 5, in order from the object side to the image side, includes, a first lens unit G1 having negative optical power, a second lens unit G2 having positive optical power, a third lens unit G3 having positive optical power, a fourth lens unit G4 having negative optical power, and a fifth lens unit G5 having positive optical power.

The first lens unit G1, in order from the object side to the image side, includes: a negative meniscus first lens element L1 with the convex surface facing the object side; a negative meniscus second lens element L2 with the convex surface facing the object side; a negative meniscus third lens element L3 with the convex surface facing the object side; a bi-concave fourth lens element L4; and a positive meniscus fifth lens element L5 with the convex surface facing the object side. The fourth lens element L4 and the fifth lens element L5 are cemented with each other. A surface of the third lens element L3 facing the image side is aspheric.

The second lens unit G2, in order from the object side to the image side, includes: a negative meniscus sixth lens element L6 with the convex surface facing the object side; and a positive meniscus seventh lens element L7 with the convex surface facing the object side. The sixth lens element L6 and the seventh lens element L7 are cemented with each other. Further, a surface of the seventh lens element L7 facing the image side is aspheric.

The third lens unit G3, in order from the object side to the image side, includes: a bi-concave eighth lens element L8; a bi-convex ninth lens element L9; a bi-concave tenth lens element L10; a bi-convex eleventh lens element L11; and a bi-convex twelfth lens element L12. The eighth lens element L8 and the ninth lens element L9 are cemented with each other. In addition, the tenth lens element L10 and the eleventh lens element L11 are cemented with each other.

The fourth lens unit G4 consists of a negative meniscus thirteenth lens element L13 with the convex surface facing the object side.

The fifth lens unit G5, in order from the object side to the image side, includes: a negative meniscus fourteenth lens element L14 with the convex surface facing the object side; and a bi-convex fifteenth lens element L15. A surface of the fifteenth lens element L15 facing the image side is aspheric.

At the time of zooming, the plurality of lens units move along the optical axis such that: the interval between the first lens unit G1 and the second lens unit G2 at a telephoto limit is made shorter than the interval at a wide-angle limit; the interval between the second lens unit G2 and the third lens unit G3 at a telephoto limit is made shorter than the interval at a wide-angle limit; the interval between the third lens unit G3 and the fourth lens unit G4 at a telephoto limit hardly changes from the interval at a wide-angle limit; and the interval between the fourth lens unit G4 and the fifth lens unit G5 at a telephoto limit is made longer than the interval at a wide-angle limit. More specifically, at the time of zooming from a wide-angle limit to a telephoto limit, the first lens unit G1 moves to the image side along the optical axis, whereas the second lens unit G2, the third lens unit G3, and the fourth lens unit G4 move to the object side along the optical axis. The fifth lens unit G5 is fixed relative to the image surface S at the time of zooming. The aperture diaphragm A moves to the object side together with the second lens unit G2.

Further, at the time of focusing from an infinity in-focus condition to a close-point in-focus condition, the fourth lens unit G4 moves to the image side along the optical axis.

Embodiment 6

The zoom lens system according to Embodiment 6, in order from the object side to the image side, includes a first lens unit G1 having negative optical power, a second lens unit G2 having positive optical power, a third lens unit G3 having positive optical power, and a fourth lens unit G4 having positive optical power.

The first lens unit G1, in order from the object side to the image side, includes: a negative meniscus first lens element L1 with the convex surface facing the object side; a negative meniscus second lens element L2 with the convex surface facing the object side; a negative meniscus third lens element L3 with the convex surface facing the object side; a negative meniscus fourth lens element L4 with the convex surface facing the image side; and a positive meniscus fifth lens element L5 with the convex surface facing the object side. A surface of the second lens element L2 facing the object side and a surface of the fourth lens element L4 facing the image side are aspheric.

The second lens unit G2 consists of a bi-convex sixth lens elements L6. Both surfaces of the six lens element L6 are aspheric.

The third lens unit G3, in order from the object side to the image side, includes: a bi-convex seventh lens element L7; a bi-concave eighth lens element L8; a bi-convex ninth lens element L9; a bi-convex tenth lens element L10; a bi-concave eleventh lens element L11; a bi-convex twelfth lens element L12; and a positive meniscus thirteenth lens element L13 with the convex surface facing the image side. The seventh lens element L7, the eighth lens element L8, and the ninth lens element L9 are cemented with each other. In addition, the tenth lens element L10, the eleventh lens element L11, and the twelfth lens element L12 are cemented with each other.

The fourth lens unit G4, in order from the object side to the image side, includes: a bi-concave fourteenth lens element L14; a bi-convex fifteenth lens element L15; and a negative meniscus sixteenth lens element L16 with the convex surface facing the object side. The fourteenth lens element L14 and the fifteenth lens element L15 are cemented with each other. A surface of the sixteenth lens element L16 facing the image side is aspheric.

At the time of zooming, the respective lens units move along the optical axis such that: the interval between the first lens unit G1 and the second lens unit G2 at a telephoto limit is made shorter than the interval at a wide-angle limit; the interval between the second lens unit G2 and the third lens unit G3 at a telephoto limit is made shorter than the interval at a wide-angle limit; and the interval between the third lens unit G3 and the fourth lens unit G4 at a telephoto limit is made longer than the interval at a wide-angle limit. More specifically, at the time of zooming from a wide-angle limit to a telephoto limit, the first lens unit G1 moves to the image side along the optical axis, whereas the second lens unit G2, the third lens unit G3, and the fourth lens unit G4 move to the object side along the optical axis. The aperture diaphragm A moves to the object side together with the second lens unit G2.

Further, at the time of focusing from an infinity in-focus condition to a close-point in-focus condition, the second lens unit G2 moves to the image side along the optical axis.

The following description is given for conditions to be satisfied by the zoom lens system according to each embodiment. Here, in the zoom lens system according to each embodiment, a plurality of conditions to be satisfied are set forth. Thus, a configuration of the zoom lens system that satisfies as many applicable conditions as possible is most preferable. However, when an individual condition is satisfied, a zoom lens system having a corresponding effect can be obtained.

In the zoom lens system according to the respective embodiments, it is preferable that the following condition is satisfied.

$$-0.65 < f_W/f_1 < -0.45 \quad (1)$$

where, $f_1$ is a focal length of the first lens unit, and $f_W$ is a focal length of the entire system at a wide-angle limit.

The condition (1) sets forth the ratio between the focal length of the entire system and the focal length of the first lens unit. When the value exceeds the upper limit of the condition (1), it becomes difficult to compensate the astigmatism or the distortion, which causes difficulty in achieving preferable optical performance in the periphery part of the image. Further, when the value goes below the lower limit of the condition (1), the entire length of the lenses increases, and in addition, the diameter of the first lens unit increases. Thus, it becomes difficult to achieve the size reduction.

In the zoom lens system according to the respective embodiments, it is preferable that the following condition is satisfied.

$$0.1 < f_W/f_2 < 0.3 \quad (2)$$

where, $f_2$ is a focal length of the second lens unit, and $f_W$ is a focal length of the entire system at a wide-angle limit.

The condition (2) sets forth the ratio between the focal length of the entire system and the focal length of the second lens unit. When the value exceeds the upper limit of the condition (2), the entire length of the lenses increases, and it becomes difficult to achieve the size reduction. At the same time, it becomes difficult to preferably compensate a so-called coma aberration in a range from a middle position to a telephoto limit. Further, when the value goes below the lower limit of the condition (2), there is no effect of the field curvature compensation, which is obtained by imparting the refractive power to the second lens unit and to the subsequent third lens unit and changing the interval therebetween by zooming. Thus, it becomes difficult to achieve the preferable optical performance in the periphery part of the image.

In the zoom lens system according to the respective embodiments, it is preferable that the following condition is satisfied.

$$0.25 < f_W/f_3 < 0.5 \quad (3)$$

where, $f_3$ is a focal length of the third lens unit, and $f_W$ is a focal length of the entire system at a wide-angle limit.

The condition (3) sets forth the ratio between the focal length of the entire system and the focal length of the third lens unit. When the value exceeds the upper limit of the condition (3), it becomes difficult to compensate the spherical aberration or the coma aberration which relates to the optical performance on and around the optical axis, and in addition, the intervals between third lens unit and the lens units before and after the third lens unit become insufficient, which causes difficulty in configuring the zoom lens system. Further, when the value goes below the lower limit of the condition (3), the amount of movement of the third lens unit increases at the time of variation of magnification, and thus it becomes difficult to achieve the size reduction.

In the zoom lens system according to the respective embodiments, it is preferable that the following condition is satisfied.

$$-0.1 < f_W/f_4 < -0.05 \quad (4)$$

where, $f_4$ is a focal length of the fourth lens unit, and $f_W$ is a focal length of the entire system at a wide-angle limit.

The condition (4) sets forth the ratio between the focal length of the entire system and the focal length of the fourth lens unit. When the value exceeds the upper limit of the condition (4), a change in the astigmatism or the like caused by the decentering error or the like of the fourth lens unit increases. In addition, since the positive optical power of the third lens unit on the object side relative to the fourth lens unit increase, a change in the coma aberration caused by the decentering error or the like of the third lens unit is apt to increase. Thus, the situation is not preferable since costs necessary for manufacturing increase. Further, when the value goes below the lower limit of the condition (4), the amount of movement of the fourth lens unit at the time of focusing increases, and thus it becomes difficult to achieve the size reduction.

In the zoom lens system according to the respective embodiments, it is preferable that the following condition is satisfied.

$$0.01 < f_W/f_5 < 0.15 \quad (5)$$

where, $f_5$ is a focal length of the fifth lens unit, and $f_W$ is a focal length of the entire system at a wide-angle limit.

The condition (5) sets forth the ratio between the focal length of the entire system and the focal length of the fifth lens unit. When the value exceeds the upper limit of the condition (5), the zoom lens system is approximate to the true telecentric condition. Thus, the diameter of the fifth lens unit increases, and as a result it becomes difficult to achieve the size reduction. Further, when the value goes below the lower limit of the condition (5), the zoom lens system is deviated from the telecentric condition, and in particular, the incident angle of light to be incident on the periphery part of the image sensor increases, and thus this situation is unpreferable in terms of characteristics of the image sensor.

In the zoom lens system according to the respective embodiments, it is preferable that the following condition is satisfied.

$$DIS_W < -8 \quad (6)$$

where, $DIS_W$ is distortion (%) at the maximum image height at a wide-angle limit.

The distortion $DIS_W$ can be obtained from the following formula.

$$DIS_W = (Y'-Y)/Y \times 100 (\text{unit: \%})$$

(where, Y' is a real image height, and Y is an ideal image height).

When the value exceeds the upper limit of the condition (6), the distortion is compensated excessively, and it becomes difficult to compensate the coma aberration or the astigmatism. Thus, it becomes difficult to achieve the size reduction.

In the zoom lens system according to the respective embodiments, it is preferable that the following condition is satisfied.

$$2.3 < (R_{11}+R_{12})/(R_{11}-R_{12}) < 10 \quad (7)$$

where, $R_{11}$ is an object side curvature radius of the lens element closest to the object side in the first lens unit, and $R_{12}$ is an image side curvature radius of the lens element closest to the object side in the first lens unit.

The condition (7) sets forth the shape of the lens element closest to the object side in the first lens unit. When the value exceeds the upper limit of the condition (7), the diameter of the lens element increases, and it becomes difficult to process the lens element. Thus, it becomes difficult to achieve the size reduction, and at the same time, the manufacturing costs increase. Further, when the value goes below the lower limit of the condition (7), a large negative distortion is generated, and thus this leads to insufficient compensation of the distortion.

In the zoom lens system according to the respective embodiments, it is preferable that the following condition is satisfied.

$$2.3 < (R_{21}+R_{22})/(R_{21}-R_{22}) < 10 \quad (8)$$

where, $R_{21}$ is an object side curvature radius of the second lens element from the object side in the first lens unit, and $R_{22}$ is an image side curvature radius of the second lens element from the object side in the first lens unit.

The condition (8) sets forth the shape of the second lens element from the object side in the first lens unit. When the value exceeds the upper limit of the condition (8), the diameter of the lens element increases, and it becomes difficult to process the lens element. Thus, it becomes difficult to achieve the size reduction, and at the same time, the manufacturing costs increase. Further, when the value goes below the lower limit of the condition (8), a large negative distortion is generated, and thus this leads to insufficient compensation of the distortion.

In the zoom lens system according to the respective embodiment, it is preferable that the following condition is satisfied.

$$2.3 < (R_{31}+R_{32})/(R_{31}-R_{32}) < 10 \tag{9}$$

where, $R_{31}$ is an object side curvature radius of the third lens element from the object side in the first lens unit, and $R_{32}$ is an image side curvature radius of the third lens element from the object side in the first lens unit.

The condition (9) sets forth the shape of the third lens element from the object side in the first lens unit. When the value exceeds the upper limit of the condition (9), the diameter of the lens element increases, and it becomes difficult to process the lens element. Thus, it becomes difficult to achieve the size reduction, and at the same time, the manufacturing costs increases. Further, when the value goes below the lower limit of the condition (9), a large negative distortion is generated, and thus this leads to insufficient compensation of the distortion.

In the zoom lens system according to the respective embodiments, it is preferable that the following condition is satisfied.

$$1.4 < DL/YM < 2.5 \tag{10}$$

(where, $100 < 2\omega_W < 140$) where,

DL is an effective diameter of the lens surface closest to the image side,

YM is the maximum image height at a wide-angle limit, and $\omega_W$ is a half view angle (°) at a wide-angle limit.

The condition (10) sets forth the ratio between the effective diameter of the lens surface closest to the image side and the maximum image height. When the value exceeds the upper limit of the condition (10), the diameter of the lens closest to the image side increases, and it becomes difficult to achieve the size reduction. Further, when the value goes below the lower limit of the condition (10), the back focus needs to be elongated in order to avoid an increase in the incident angle of light. Thus, it becomes difficult to achieve the size reduction.

In the zoom lens system according to the respective embodiments, it is preferable that the following condition is satisfied.

$$1.2 < BF_W/YM < 1.6 \tag{11}$$

where, $BF_W$ is the back focus at a wide-angle limit,

YM is the maximum image height at a wide-angle limit, and $\omega_W$ is a half view angle (°) at a wide-angle limit.

The condition (11) sets forth the ratio between the back focus at a wide-angle limit and the maximum image height. When the value exceeds the upper limit of the condition (11), the zoom lens system exhibits a significant retrofocus characteristic, which causes difficulty in compensating the distortion. Thus, it becomes difficult to achieve the size reduction. Further, when the value goes below the lower limit of the condition (11), the shadow of foreign particles (dust) adhering to the surface of the lens closest to the image side becomes significant on the taken image. Thus, handling of the interchangeable lens apparatus becomes complicated. For example, adherence of foreign particles needs to be carefully checked at the time of changing the lens system.

Here, the lens units constituting the zoom lens system of the respective embodiments may be composed exclusively of refractive type lens elements that deflect the incident light by refraction (that is, lenses of a type in which deflection is achieved at the interface between media each having a distinct refractive index). Alternatively, the lens units may employ any one of or a combination of some of: diffractive type lens elements that deflect the incident light by diffraction; refractive-diffractive hybrid type lens elements or the like that deflect the incident light by a combination of diffraction and refraction; and gradient index type lens elements that deflect the incident light by distribution of refractive index in the medium.

Embodiment 7

Figure 13:
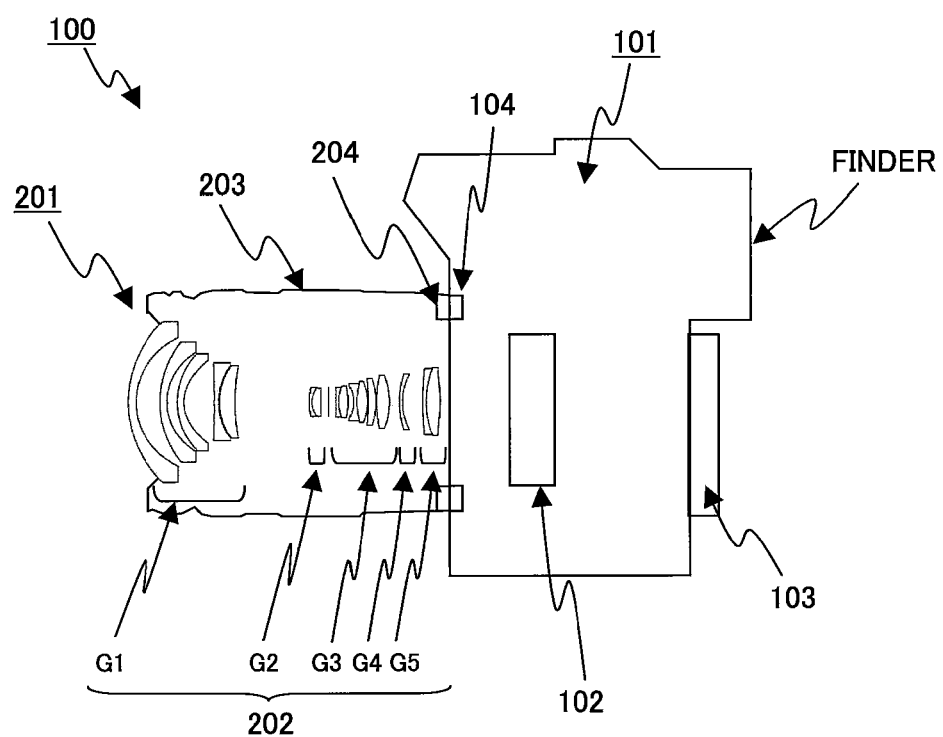
FIG. 13 is a schematic construction diagram of an interchangeable-lens type digital camera system according to Embodiment 7.

FIG. 13 is a schematic construction diagram of an interchangeable-lens type digital camera system according to Embodiment 7.

A interchangeable-lens type digital camera system 100 (hereinafter, simply referred to as "camera system") according to the present embodiment includes a camera body 101, and an interchangeable lens apparatus 201 connected to the camera body 101 in an attachable and removable manner.

The camera body 101 includes an image sensor 102 which receives an optical image formed by a zoom lens system 202 of the interchangeable lens apparatus 201 thereby to convert the optical image into an electric image signal, a liquid crystal display monitor 103 which displays an image signal converted by the image sensor 102, and a camera mount section 104. On the other hand, the interchangeable lens apparatus 201 includes the zoom lens system 202 according to any one of Embodiments 1 to 6, a lens barrel which holds the zoom lens system 202, and a lens mount section 204 connected to the camera mount section 104 of the camera body. The camera mount section 104 and the lens mount section 204 are connected to each other not only physically but also electrically, and function as interfaces. That is, a controller (not shown) inside the camera body 101 is electrically connected to a controller (not shown) inside the interchangeable lens apparatus 201, thereby achieving mutual signal communication.

The camera system 100 according to the present embodiment includes the zoom lens system 202 according to any one of Embodiments 1 to 6, and hence is capable of displaying an preferable optical image at the time of focusing in a live view state.

EXAMPLES

Hereinafter, numerical examples will be described below in which the zoom lens systems according to Embodiments 1 to 6 are implemented specifically. As will be described later, Numerical Examples 1 to 6 corresponds to Embodiments 1 to 6, respectively. Here, in each numerical example, the units of the length are all "mm", while the units of the view angle are all "°". Moreover, in the numerical examples, r is the radius of curvature, d is the axial distance, nd is the refractive index to the d-line, and vd is the Abbe number to the d-line. In the numerical examples, the surfaces marked with "*" are aspheric surfaces, and the aspheric surface configuration is defined by the following formula.

$$Z = \frac{h^2/r}{1+\sqrt{1-(1+\kappa)(h/r)^2}} + \sum A_n h^n$$

Here, the symbols in the formula indicate the following quantities:
Z is the distance from an on-the-aspheric-surface point at a height h relative to the optical axis to a tangential plane at the top of the aspheric surface;
h is the height relative to the optical axis;
r is the radius of curvature at the top;
κ is the conic constant; and
An is the n-th order aspheric coefficient.

FIGS. 2, 4, 6, 8, 10, and 12 are longitudinal aberration diagrams of an infinity in-focus condition of the zoom lens systems according to Numerical Examples 1, 2, 3, 4, 5, and 6.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)), and the distortion (DIS (%)). In each spherical aberration diagram, the vertical axis indicates the F-number (in each diagram, indicated as F), the solid line, the short dash line, and the long dash line indicate the characteristics to the d-line, the F-line, and the C-line, respectively. In each astigmatism diagram, the vertical axis indicates the image height (in each diagram, indicated as H), the solid line and the dash line indicate the characteristics to the sagittal image plane (in each diagram, indicated as "s") and the meridional image plane (in each diagram, indicated as "m"), respectively.

Numerical Example 1

The zoom lens system of Numerical Example 1 corresponds to Embodiment 1 shown in FIG. 1. Data of the zoom lens system according to Numerical Example 1, i.e., the surface data, the aspherical data, the various data, the lens element data, the zoom lens unit data, and the zoom lens unit magnification are shown in Table 1, Table 2, Table 3, Table 4, Table 5, and Table 6, respectively.

TABLE 1

(Surface data)

| Surface number | r | d | nd | vd |
|---|---|---|---|---|
| Object surface | ∞ | | | |
| 1 | 32.61610 | 2.00000 | 1.80420 | 46.5 |
| 2 | 20.03180 | 6.25890 | | |
| 3 | 28.62190 | 1.80000 | 1.80420 | 46.5 |
| 4 | 16.57000 | 2.64120 | | |
| 5 | 20.52130 | 1.70000 | 1.80800 | 40.9 |
| 6* | 11.47060 | 7.78130 | | |
| 7 | −302.25460 | 1.05000 | 1.49700 | 81.6 |
| 8 | 17.88820 | 0.26000 | | |
| 9 | 18.09470 | 4.00840 | 1.80610 | 33.3 |
| 10 | 60.79620 | Variable | | |
| 11 | 19.24800 | 0.70000 | 1.74330 | 49.2 |
| 12 | 6.77140 | 2.24910 | 1.67270 | 32.2 |
| 13 | 170.51120 | 1.89140 | | |
| 14 (Diaphragm) | ∞ | Variable | | |
| 15 | 3979.65950 | 0.70000 | 1.84666 | 23.8 |
| 16 | 13.78260 | 2.33950 | 1.51680 | 64.2 |
| 17 | −21.54820 | 1.31900 | | |
| 18 | −9.53570 | 0.80000 | 1.51680 | 64.2 |
| 19 | 21.19960 | 2.89150 | 1.49700 | 81.6 |
| 20 | −15.02470 | 0.20000 | | |

TABLE 1-continued (Surface data)

| Surface number | r | d | nd | vd |
|---|---|---|---|---|
| 21 | −58.86510 | 1.97180 | 1.49700 | 81.6 |
| 22 | −20.72310 | 0.20000 | | |
| 23 | 41.66740 | 3.23430 | 1.49700 | 81.6 |
| 24 | −20.80500 | Variable | | |
| 25 | 26.65630 | 0.80000 | 1.51823 | 59.0 |
| 26 | 17.53640 | Variable | | |
| 27 | 84.08090 | 0.90000 | 1.80518 | 25.5 |
| 28 | 27.44430 | 3.57720 | 1.52300 | 70.1 |
| 29* | −39.99340 | BF | | |
| Image surface | ∞ | | | |

TABLE 2

(Aspherical data)

| Surface No. | Parameters |
|---|---|
| 6 | K = −4.01413E−01, A4 = −2.82803E−05, A6 = −1.13654E−07, A8 = −7.54243E−10, A10 = 5.36525E−12, A12 = −3.87978E−14 |
| 29 | K = 0.00000E+00, A4 = 5.16711E−05, A6 = 2.64198E−07, A8 = −6.34113E−09, A10 = 9.00687E−11, A12 = −4.31222E−13 |

TABLE 3

(Various data)
Zooming ratio 1.89190

| | Wide | Middle | Telephoto |
|---|---|---|---|
| Focal length | 7.2006 | 9.9053 | 13.6229 |
| F-number | 4.00268 | 3.85380 | 4.09472 |
| View angle | 59.0156 | 48.7020 | 38.1410 |
| Image height | 10.8150 | 10.8150 | 10.8150 |
| Overall length of lens system | 95.5429 | 90.8643 | 89.7896 |
| BF | 15.38321 | 15.38860 | 15.39895 |
| d10 | 19.2075 | 9.1749 | 1.9157 |
| d14 | 1.9913 | 2.0522 | 1.2990 |
| d24 | 2.5261 | 2.0100 | 1.8500 |
| d26 | 5.1612 | 10.9650 | 18.0524 |
| Entrance pupil position | 19.8078 | 18.7380 | 17.5657 |
| Exit pupil position | −50.9354 | −68.0300 | −85.0516 |
| Front principal point position | 26.2266 | 27.4671 | 29.3411 |
| Back principal point position | 88.3423 | 80.9590 | 76.1668 |

TABLE 4

(Lens element data)

| Unit | Initial surface No. | Focal length |
|---|---|---|
| 1 | 1 | −69.4814 |
| 2 | 3 | −52.4229 |
| 3 | 5 | −35.1378 |
| 4 | 7 | −33.9445 |
| 5 | 9 | 30.6741 |
| 6 | 11 | −14.3986 |
| 7 | 12 | 10.4247 |
| 8 | 15 | −16.3366 |
| 9 | 16 | 16.6409 |
| 10 | 18 | −12.6150 |
| 11 | 19 | 18.1737 |
| 12 | 21 | 63.2652 |
| 13 | 23 | 28.4087 |
| 14 | 25 | −101.9601 |
| 15 | 27 | −50.9622 |
| 16 | 28 | 31.6971 |

TABLE 5

(Zoom lens unit data)

| Unit | Initial surface No. | Focal length | Length of lens unit | Front principal point position | Back principal point position |
|---|---|---|---|---|---|
| 1 | 1 | −14.89596 | 27.49980 | 9.27046 | 14.76759 |
| 2 | 11 | 40.61921 | 4.84050 | −0.45077 | 0.77074 |
| 3 | 15 | 22.48920 | 13.65610 | 11.20519 | 17.60033 |
| 4 | 25 | −101.96007 | 0.80000 | 1.58769 | 1.84449 |
| 5 | 27 | 80.78660 | 4.47720 | 2.60670 | 4.21608 |

TABLE 6

(Zoom lens unit magnification)

| Unit | Initial surface No. | Wide | Middle | Telephoto |
|---|---|---|---|---|
| 1 | 1 | 0.00000 | 0.00000 | 0.00000 |
| 2 | 11 | −7.04498 | 9.51959 | 3.52410 |
| 3 | 15 | 0.06774 | −0.06597 | −0.23278 |
| 4 | 25 | 1.25623 | 1.31323 | 1.38290 |
| 5 | 27 | 0.80635 | 0.80628 | 0.80616 |

Numerical Example 2

Figure 3:
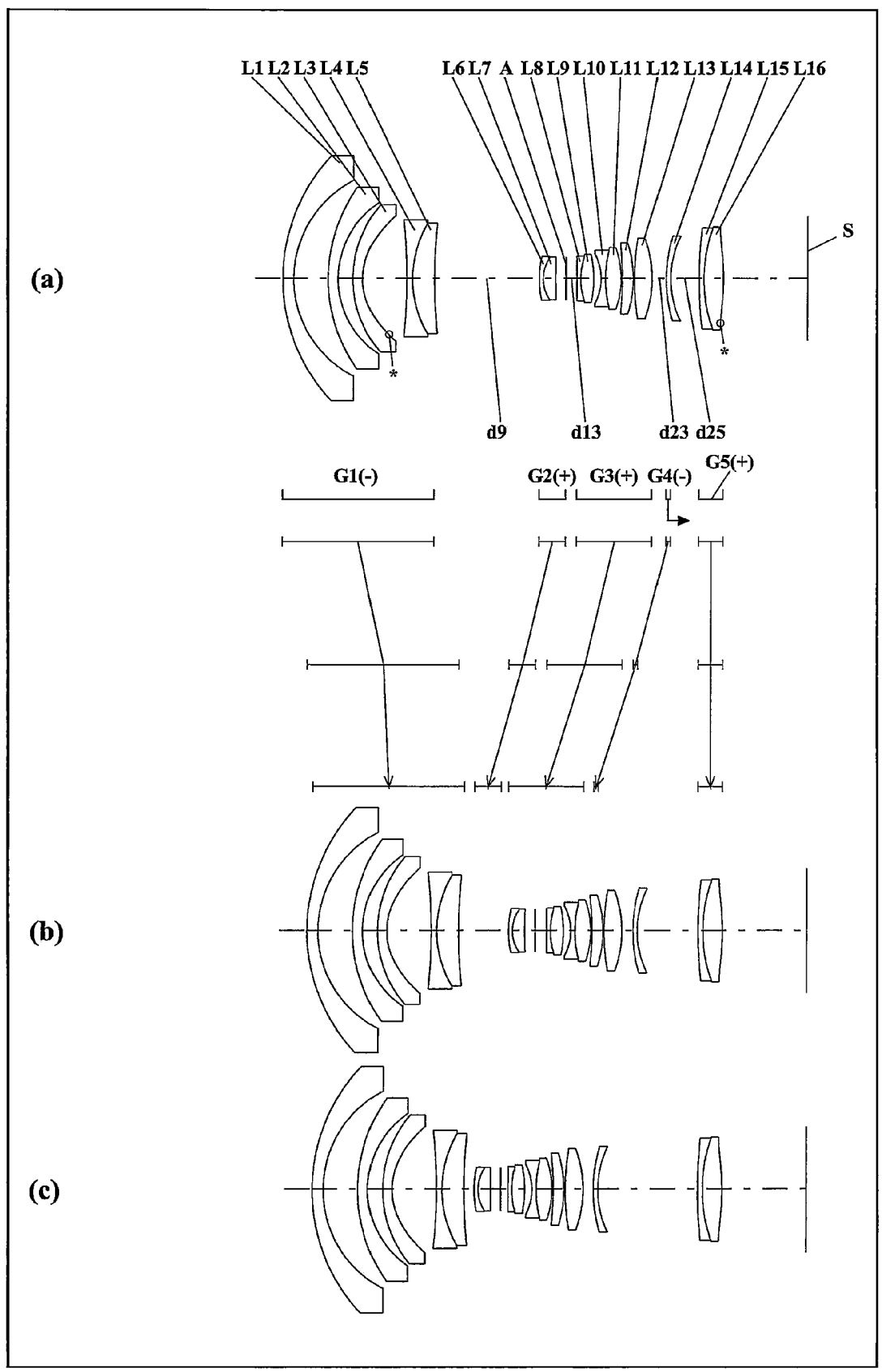
FIG. 3 is a lens arrangement diagram showing an infinity in-focus condition of a zoom lens system according to Embodiment 2 (Example 2)
Figure 4:
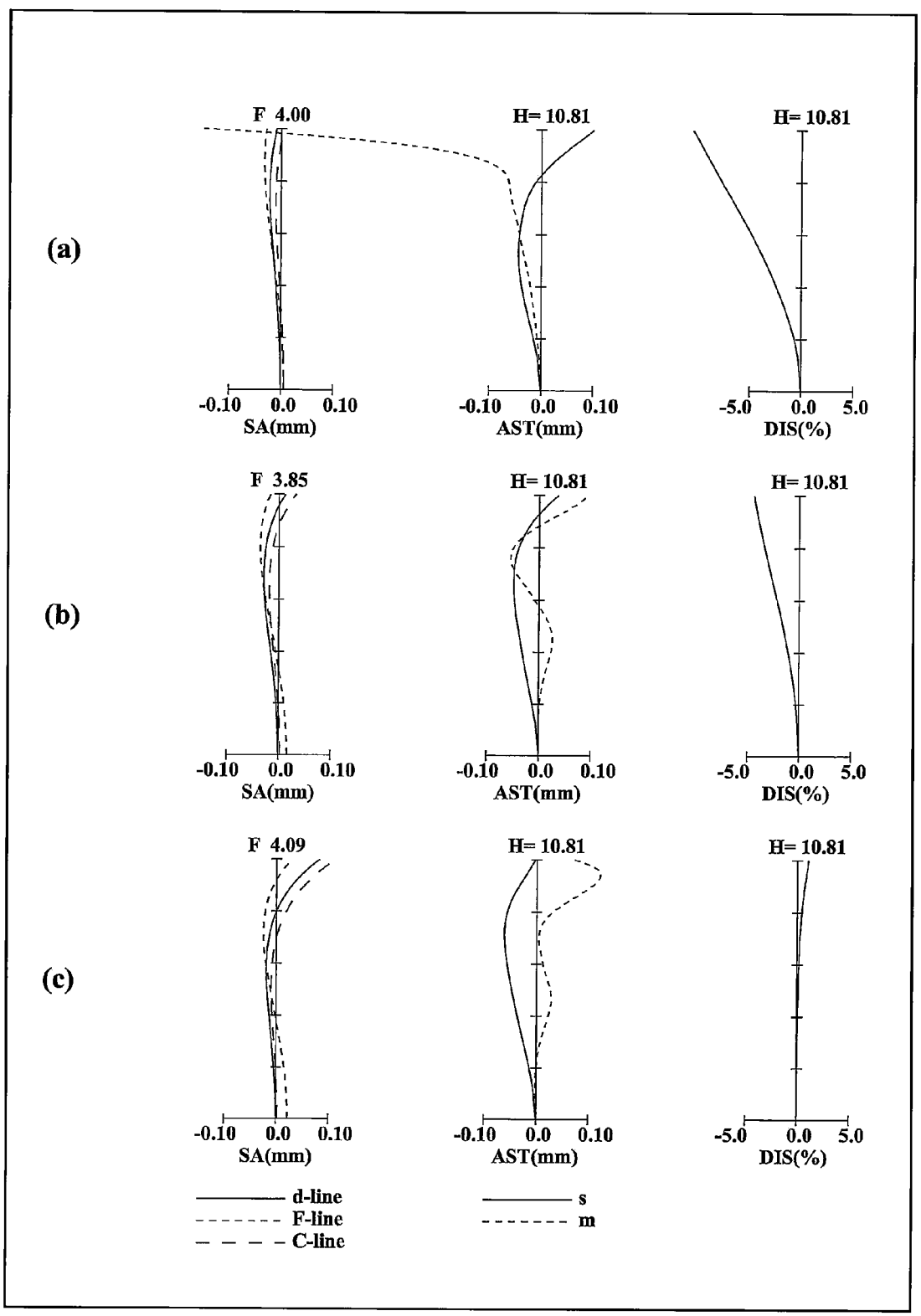
FIG. 4 is a longitudinal aberration diagram showing an infinity in-focus condition of a zoom lens system according to Example 2.

The zoom lens system of Numerical Example 2 corresponds to Embodiment 2 shown in FIG. 3. Data of the zoom lens system according to Numerical Example 2, i.e., the surface data, the aspherical data, the various data, the lens element data, the zoom lens unit data, and the zoom lens unit magnification are shown in Table 7, Table 8, Table 9, Table 10, Table 11, and Table 12, respectively.

TABLE 7

(Surface data)

| Surface number | r | d | nd | vd |
|---|---|---|---|---|
| Object surface | ∞ | | | |
| 1 | 32.47020 | 2.00000 | 1.80420 | 46.5 |
| 2 | 20.03180 | 6.27370 | | |
| 3 | 28.59860 | 1.80000 | 1.80420 | 46.5 |
| 4 | 16.57000 | 2.70090 | | |
| 5 | 20.52130 | 1.70000 | 1.80800 | 40.9 |
| 6* | 11.44550 | 8.07250 | | |
| 7 | −100.75020 | 1.00000 | 1.49700 | 81.6 |
| 8 | 19.58010 | 4.00410 | 1.80610 | 33.3 |
| 9 | 92.88670 | Variable | | |
| 10 | 18.85950 | 0.70000 | 1.74330 | 49.2 |
| 11 | 6.74340 | 2.25040 | 1.67270 | 32.2 |
| 12 | 116.25340 | 1.89560 | | |
| 13 (Diaphragm) | ∞ | Variable | | |
| 14 | 595.95060 | 0.70000 | 1.84666 | 23.8 |
| 15 | 13.82680 | 2.34620 | 1.51680 | 64.2 |
| 16 | −21.12650 | 1.32080 | | |
| 17 | −9.70390 | 0.80000 | 1.51680 | 64.2 |
| 18 | 20.99080 | 2.87260 | 1.49700 | 81.6 |
| 19 | −15.71880 | 0.20000 | | |
| 20 | −58.64710 | 1.97850 | 1.49700 | 81.6 |
| 21 | −20.62270 | 0.20000 | | |
| 22 | 41.46940 | 3.23800 | 1.49700 | 81.6 |
| 23 | −20.82360 | Variable | | |
| 24 | 26.64750 | 0.80000 | 1.51823 | 59.0 |
| 25 | 17.53290 | Variable | | |
| 26 | 81.82020 | 0.90000 | 1.80518 | 25.5 |
| 27 | 27.27070 | 3.58130 | 1.52300 | 70.1 |
| 28* | −40.37930 | BF | | |
| Image surface | ∞ | | | |

TABLE 8

(Aspherical data)

| Surface No. | Parameters |
|---|---|
| 6 | K = −3.93507E−01, A4 = −2.91092E−05, A6 = −9.83771E−08, A8 = −1.09494E−09, A10 = 7.89710E−12, A12 = −4.73408E−14 |
| 28 | K = 0.00000E+00, A4 = 5.27176E−05, A6 = 2.51049E−07, A8 = −5.97520E−09, A10 = 8.53715E−11, A12 = −4.07934E−13 |

TABLE 9

(Various data)
Zooming ratio 1.88982

| | Wide | Middle | Telephoto |
|---|---|---|---|
| Focal length | 7.2052 | 9.9040 | 13.6166 |
| F-number | 4.00224 | 3.85285 | 4.09430 |
| View angle | 59.1763 | 48.7875 | 38.1653 |
| Image height | 10.8150 | 10.8150 | 10.8150 |
| Overall length of lens system | 95.5329 | 90.8882 | 89.8292 |
| BF | 15.38680 | 15.39045 | 15.40348 |
| d9 | 19.1344 | 9.1208 | 1.8888 |
| d13 | 1.9956 | 2.0689 | 1.2998 |
| d23 | 2.5108 | 2.0100 | 1.8500 |
| d25 | 5.1707 | 10.9634 | 18.0525 |
| Entrance pupil position | 19.8352 | 18.7716 | 17.6109 |
| Exit pupil position | −50.5737 | −67.7646 | −84.7428 |
| Front principal point position | 26.2533 | 27.4959 | 29.3761 |
| Back principal point position | 88.3277 | 80.9842 | 76.2125 |

TABLE 10

(Lens element data)

| Unit | Initial surface No. | Focal length |
|---|---|---|
| 1 | 1 | −70.0446 |
| 2 | 3 | −52.4889 |
| 3 | 5 | −34.9551 |
| 4 | 7 | −32.8954 |
| 5 | 8 | 30.0453 |
| 6 | 10 | −14.4782 |
| 7 | 11 | 10.5544 |
| 8 | 14 | −16.7280 |
| 9 | 15 | 16.5496 |
| 10 | 17 | −12.7277 |
| 11 | 18 | 18.5672 |
| 12 | 20 | 62.9126 |
| 13 | 22 | 28.3825 |
| 14 | 24 | −101.9672 |
| 15 | 26 | −51.1776 |
| 16 | 27 | 31.6996 |

TABLE 11

(Zoom lens unit data)

| Unit | Initial surface No. | Focal length | Length of lens unit | Front principal point position | Back principal point position |
|---|---|---|---|---|---|
| 1 | 1 | −14.90085 | 27.55120 | 9.28790 | 14.66851 |
| 2 | 10 | 42.30042 | 4.84600 | −0.60680 | 0.62440 |
| 3 | 14 | 22.37367 | 13.65610 | 11.04562 | 17.23657 |
| 4 | 24 | −101.96715 | 0.80000 | 1.58811 | 1.84491 |
| 5 | 26 | 80.34236 | 4.48130 | 2.56393 | 4.17322 |

TABLE 12

(Zoom lens unit magnification)

| Unit | Initial surface No. | Wide | Middle | Telephoto |
|---|---|---|---|---|
| 1 | 1 | 0.00000 | 0.00000 | 0.00000 |
| 2 | 10 | −10.54686 | 7.04668 | 3.19613 |
| 3 | 14 | 0.04533 | −0.08923 | −0.25690 |
| 4 | 24 | 1.25690 | 1.31376 | 1.38348 |
| 5 | 26 | 0.80465 | 0.80460 | 0.80444 |

Numerical Example 3

Figure 5:
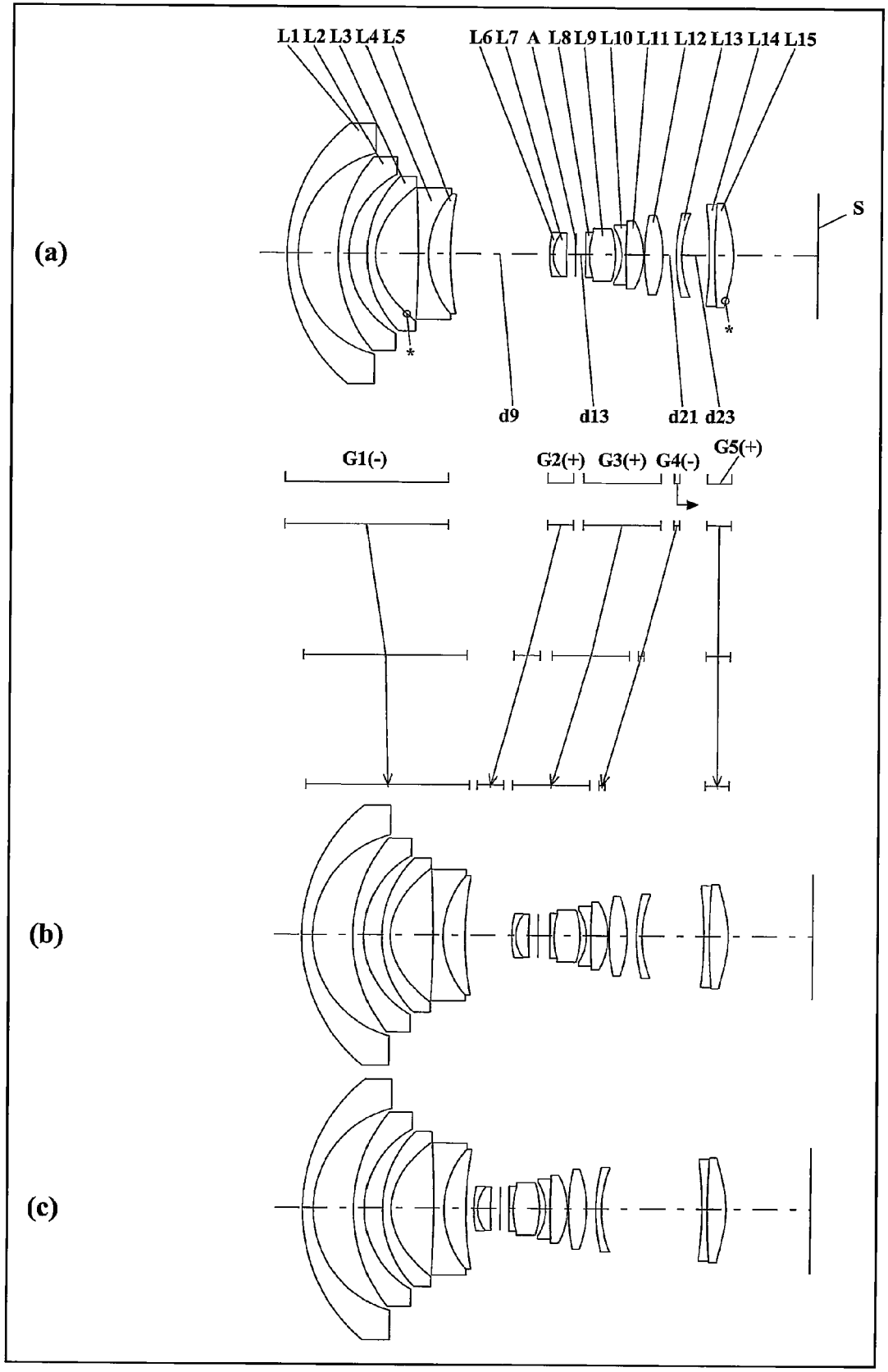
FIG. 5 is a lens arrangement diagram showing an infinity in-focus condition of a zoom lens system according to Embodiment 3 (Example 3)
Figure 6:
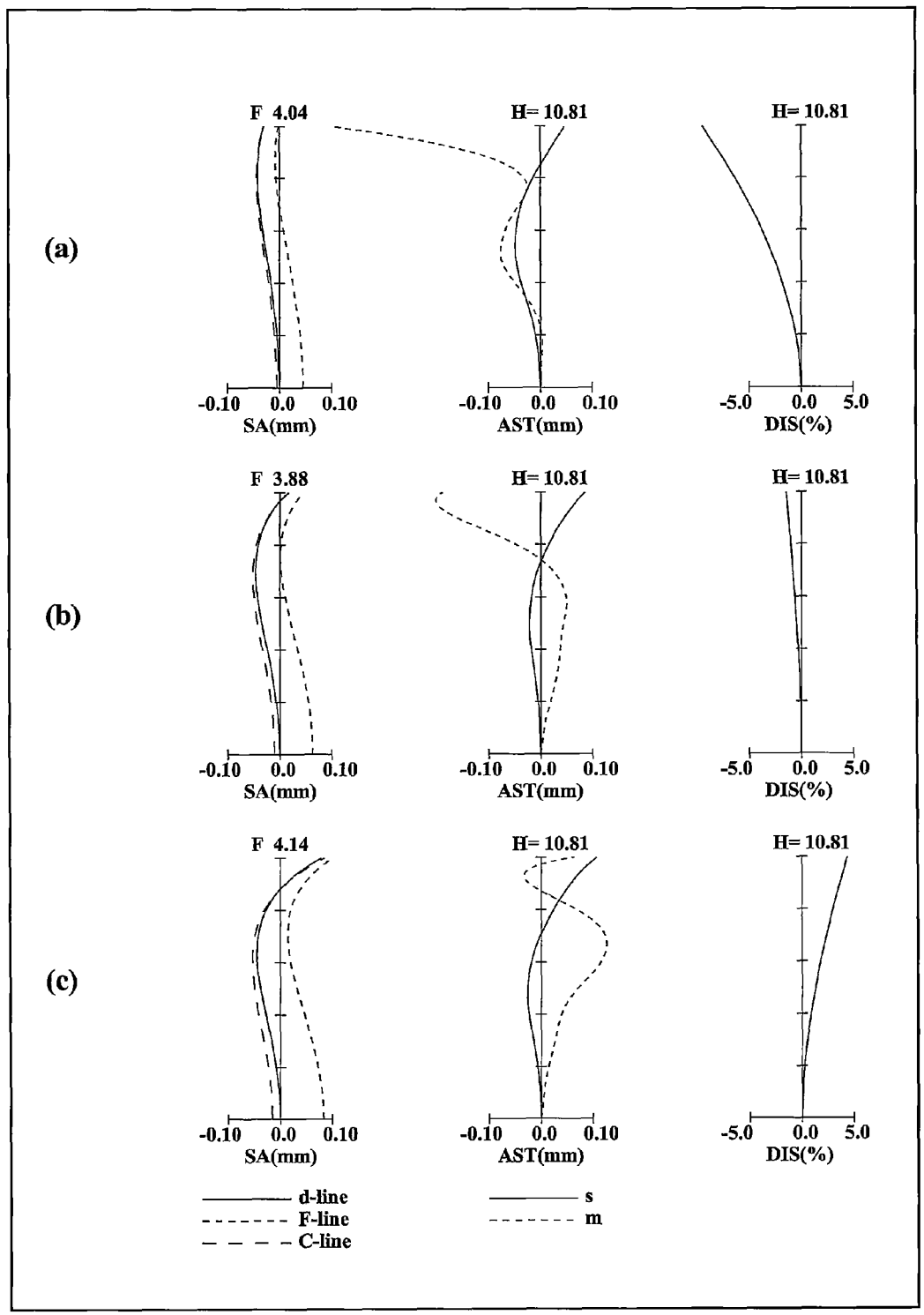
FIG. 6 is a longitudinal aberration diagram showing an infinity in-focus condition of a zoom lens system according to Example 3.

The zoom lens system of Numerical Example 3 corresponds to Embodiment 3 shown in FIG. 5. Data of the zoom lens system according to Numerical Example 3, i.e., the surface data, the aspherical data, the various data, the lens element data, the zoom lens unit data, and the zoom lens unit magnification are shown in Table 13 Table 14, Table 15, Table 16, Table 17, and Table 18, respectively.

TABLE 13

(Surface data)

| Surface number | r | d | nd | vd |
|---|---|---|---|---|
| Object surface | ∞ | | | |
| 1 | 30.44780 | 2.00000 | 1.80420 | 46.5 |
| 2 | 18.87500 | 7.34890 | | |
| 3 | 27.75750 | 1.92780 | 1.80420 | 46.5 |
| 4 | 16.42880 | 3.26840 | | |
| 5 | 19.60000 | 1.55000 | 1.80470 | 41.0 |
| 6* | 10.89970 | 7.72330 | | |
| 7 | −225.11440 | 1.89310 | 1.49700 | 81.6 |
| 8 | 16.32060 | 3.99170 | 1.80610 | 33.3 |
| 9 | 57.99910 | Variable | | |
| 10 | 18.84770 | 0.70000 | 1.72342 | 38.0 |
| 11 | 6.23040 | 2.36850 | 1.68400 | 31.3 |
| 12 | 115.54490 | 1.70700 | | |
| 13 (Diaphragm) | ∞ | Variable | | |
| 14 | ∞ | 0.70000 | 1.84666 | 23.8 |
| 15 | 13.71240 | 4.78040 | 1.51823 | 59.0 |
| 16 | −15.01690 | 1.13690 | | |
| 17 | −8.82940 | 0.80000 | 1.51680 | 64.2 |
| 18 | 104.27750 | 3.14800 | 1.49700 | 81.6 |
| 19 | −12.21860 | 0.20000 | | |
| 20 | 33.45760 | 3.28830 | 1.49700 | 81.6 |
| 21 | −21.12350 | Variable | | |
| 22 | 30.94380 | 1.00000 | 1.58144 | 40.9 |
| 23 | 19.52960 | Variable | | |
| 24 | −73.91420 | 1.00000 | 1.80518 | 25.5 |
| 25 | 123.34430 | 3.41370 | 1.52500 | 70.3 |
| 26* | −19.50200 | BF | | |
| Image surface | ∞ | | | |

TABLE 14

(Aspherical data)

| Surface No. | Parameters |
|---|---|
| 6 | K = −5.49068E−01, A4 = −1.42254E−05, A6 = −1.04715E−07, A8 = −1.46986E−10, A10 = 3.11013E−12, A12 = −2.87242E−14 |
| 26 | K = 0.00000E+00, A4 = 8.23200E−05, A6 = −7.52604E−08, A8 = 6.50947E−09, A10 = −9.16057E−11, A12 = 4.80195E−13 |

TABLE 15

(Various data)
Zooming ratio 1.88906

| | Wide | Middle | Telephoto |
|---|---|---|---|
| Focal length | 7.2009 | 9.9186 | 13.6030 |
| F-number | 4.03569 | 3.88161 | 4.13870 |
| View angle | 58.9271 | 47.9004 | 37.3032 |
| Image height | 10.8150 | 10.8150 | 10.8150 |
| Overall length of lens system | 96.5585 | 92.8958 | 92.3358 |
| BF | 15.38273 | 15.38116 | 15.38602 |
| d9 | 18.0260 | 8.4931 | 1.4460 |
| d13 | 1.7982 | 2.1728 | 1.6710 |
| d21 | 2.4078 | 1.7000 | 1.7108 |
| d23 | 4.9978 | 11.2027 | 18.1760 |
| Entrance pupil position | 20.4341 | 19.4466 | 18.3521 |
| Exit pupil position | −58.3885 | −89.5091 | −126.2034 |
| Front principal point position | 26.9321 | 28.4273 | 30.6482 |
| Back principal point position | 89.3576 | 82.9771 | 78.7328 |

TABLE 16

(Lens element data)

| Unit | Initial surface No. | Focal length |
|---|---|---|
| 1 | 1 | −66.9043 |
| 2 | 3 | −54.1627 |
| 3 | 5 | −33.1474 |
| 4 | 7 | −30.5391 |
| 5 | 8 | 27.0196 |
| 6 | 10 | −13.1720 |
| 7 | 11 | 9.5439 |
| 8 | 14 | −16.1958 |
| 9 | 15 | 14.6636 |
| 10 | 17 | −15.7133 |
| 11 | 18 | 22.2055 |
| 12 | 20 | 26.5851 |
| 13 | 22 | −94.0884 |
| 14 | 24 | −57.2713 |
| 15 | 25 | 32.3410 |

TABLE 17

(Zoom lens unit data)

| Unit | Initial surface No. | Focal length | Length of lens unit | Front principal point position | Back principal point position |
|---|---|---|---|---|---|
| 1 | 1 | −14.40374 | 29.70320 | 10.19859 | 16.32686 |
| 2 | 10 | 37.60170 | 4.77550 | −0.50091 | 0.78179 |
| 3 | 14 | 22.69792 | 14.05360 | 11.13540 | 17.51424 |
| 4 | 22 | −94.08838 | 1.00000 | 1.77131 | 2.11793 |
| 5 | 24 | 68.03402 | 4.41370 | 5.03396 | 6.83127 |

TABLE 18

(Zoom lens unit magnification)

| Unit | Initial surface No. | Wide | Middle | Telephoto |
|---|---|---|---|---|
| 1 | 1 | 0.00000 | 0.00000 | 0.00000 |
| 2 | 10 | −4.88114 | 20.55381 | 4.23608 |
| 3 | 14 | 0.10003 | −0.03110 | −0.19604 |
| 4 | 22 | 1.26498 | 1.33090 | 1.40509 |
| 5 | 24 | 0.80943 | 0.80945 | 0.80938 |

Numerical Example 4

Figure 7:
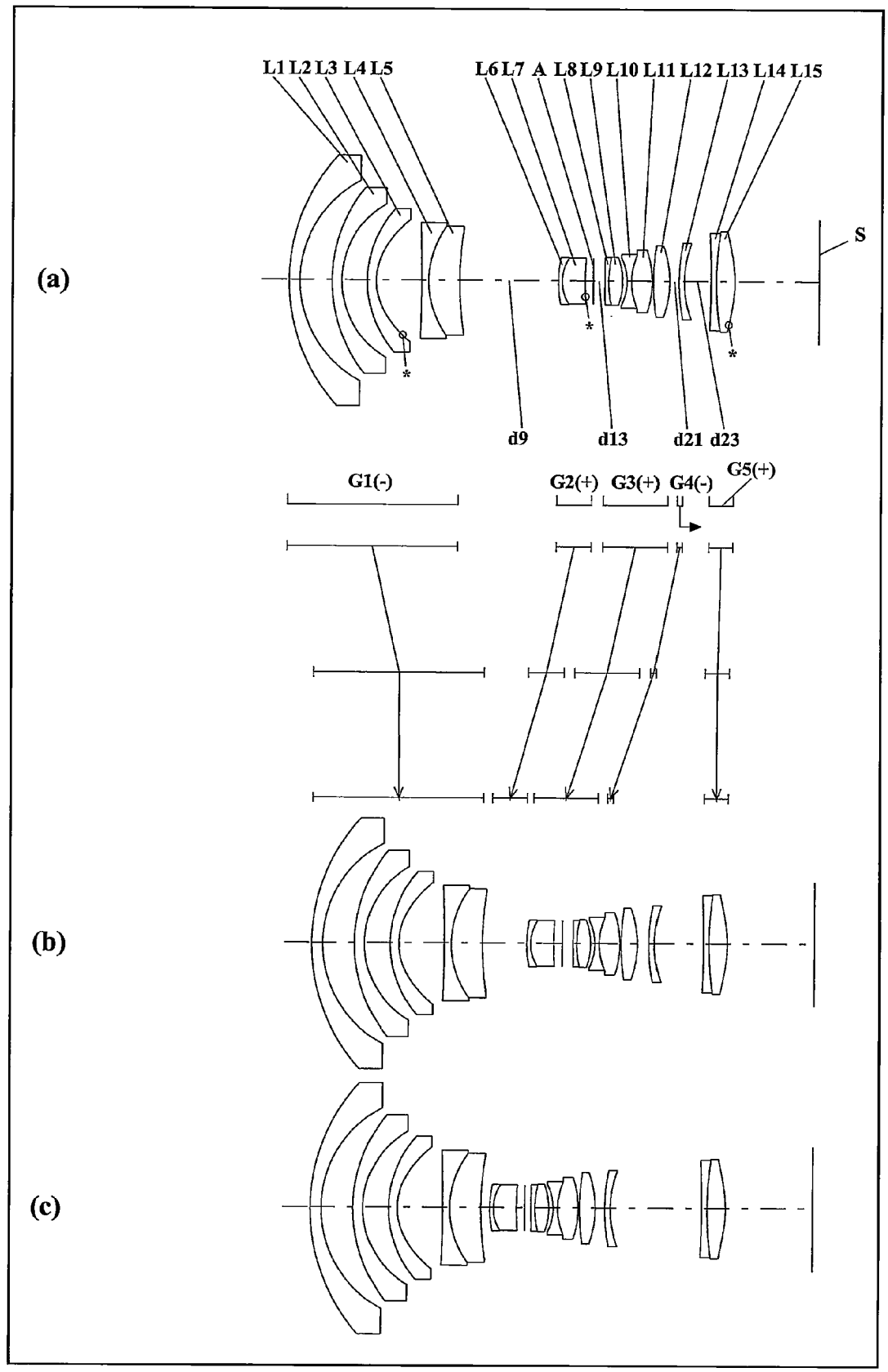
FIG. 7 is a lens arrangement diagram showing an infinity in-focus condition of a zoom lens system according to Embodiment 4 (Example 4)
Figure 8:
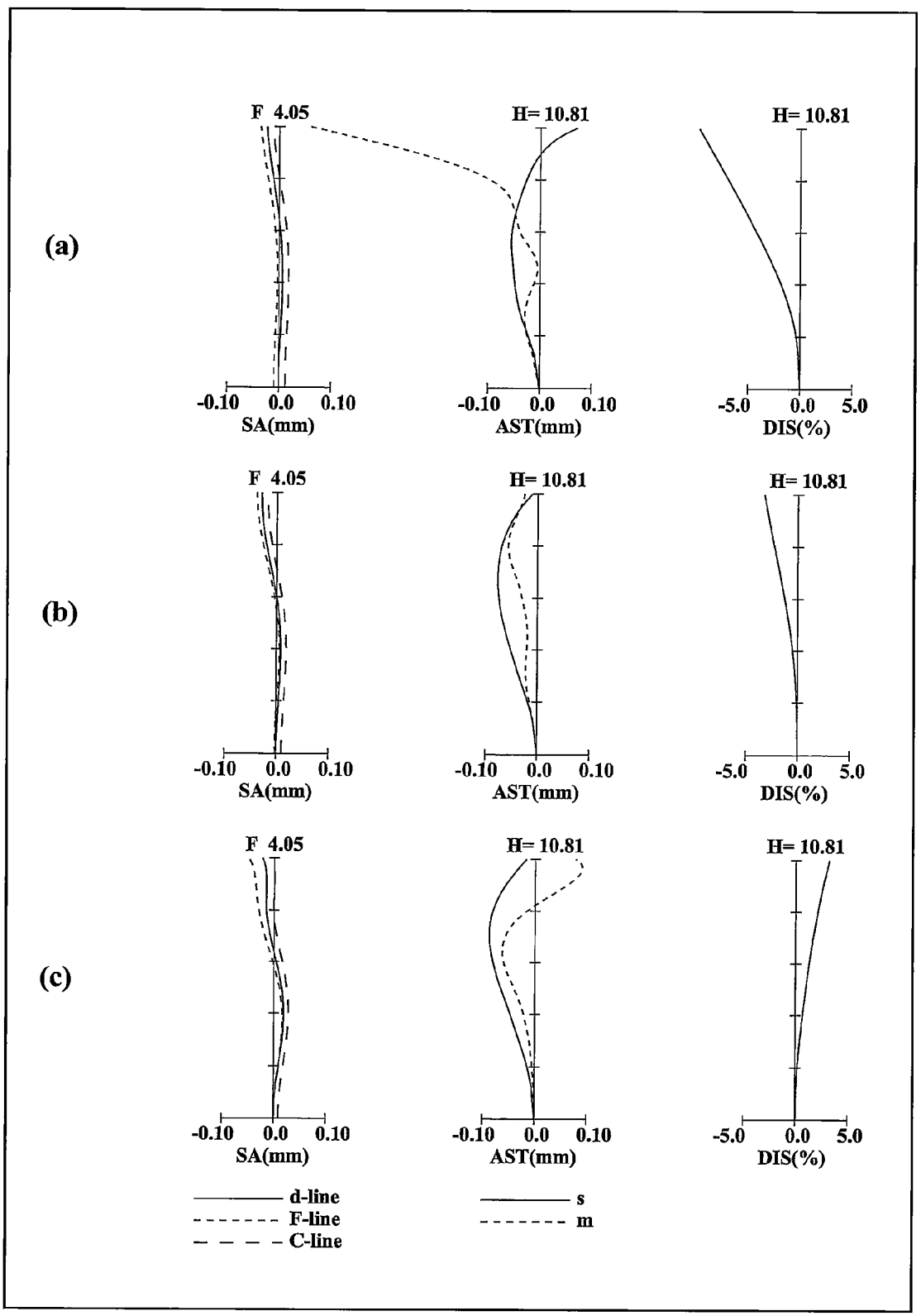
FIG. 8 is a longitudinal aberration diagram showing an infinity in-focus condition of a zoom lens system according to Example 4.

The zoom lens system of Numerical Example 4 corresponds to Embodiment 4 shown in FIG. 7. Data of the zoom lens system according to Numerical Example 4, i.e., the surface data, the aspherical data, the various data, the lens element data, the zoom lens unit data, and the zoom lens unit magnification are shown in Table 19, Table 20, Table 21, Table 22, Table 23, and Table 24, respectively.

TABLE 19

(Surface data)

| Surface number | r | d | nd | vd |
|---|---|---|---|---|
| Object surface | ∞ | | | |
| 1 | 33.73000 | 2.00000 | 1.80420 | 46.5 |
| 2 | 20.50000 | 5.85990 | | |
| 3 | 26.77380 | 1.80000 | 1.80420 | 46.5 |
| 4 | 16.10000 | 4.64310 | | |
| 5 | 19.60000 | 1.55000 | 1.80470 | 41.0 |
| 6* | 10.69470 | 8.26910 | | |
| 7 | −298.88690 | 1.26450 | 1.49700 | 81.6 |
| 8 | 16.57410 | 5.66770 | 1.80610 | 33.3 |
| 9 | 58.84120 | Variable | | |
| 10 | 19.49320 | 0.70000 | 1.72342 | 38.0 |
| 11 | 7.80550 | 4.16820 | 1.68400 | 31.3 |
| 12* | 65.51100 | 1.50600 | | |
| 13 (Diaphragm) | ∞ | Variable | | |
| 14 | 268.54290 | 0.70000 | 1.84666 | 23.8 |
| 15 | 18.67540 | 2.51990 | 1.51823 | 59.0 |
| 16 | −12.40510 | 0.78790 | | |
| 17 | −9.47110 | 0.80000 | 1.51680 | 64.2 |
| 18 | 12.00420 | 3.75020 | 1.49700 | 81.6 |
| 19 | −17.26890 | 0.20000 | | |
| 20 | 38.76770 | 2.94440 | 1.49700 | 81.6 |
| 21 | −18.34760 | Variable | | |
| 22 | 33.88100 | 1.00000 | 1.58144 | 40.9 |
| 23 | 19.79670 | Variable | | |
| 24 | −205.25430 | 1.00000 | 1.80518 | 25.5 |
| 25 | 58.31210 | 3.35500 | 1.52500 | 70.3 |
| 26* | −23.17480 | BF | | |
| Image surface | ∞ | | | |

TABLE 20

(Aspherical data)

| Surface No. | Parameters |
|---|---|
| 6 | K = −4.41439E−01, A4 = −3.54100E−05, A6 = 1.15587E−07, A8 = −3.74110E−09, A10 = 2.31717E−11, A12 = −9.50173E−14 |
| 12 | K = 0.00000E+00, A4 = 4.91209E−05, A6 = −2.40723E−06, A8 = 1.65752E−07, A10 = −4.61598E−09, A12 = 0.00000E+00 |
| 26 | K = 0.00000E+00, A4 = 7.10598E−05, A6 = 6.08469E−08, A8 = −1.63689E−09, A10 = 4.66337E−11, A12 = −2.92076E−13 |

TABLE 21

(Various data)
Zooming ratio 1.88910

| | Wide | Middle | Telephoto |
|---|---|---|---|
| Focal length | 7.2001 | 9.8960 | 13.6017 |
| F-number | 4.05005 | 4.05027 | 4.05142 |
| View angle | 58.9987 | 48.4820 | 37.6168 |
| Image height | 10.8150 | 10.8150 | 10.8150 |
| Overall length of lens system | 96.4352 | 91.3849 | 91.2929 |
| BF | 15.37255 | 15.84598 | 15.85089 |
| d9 | 17.9459 | 8.0821 | 1.5843 |
| d13 | 2.1001 | 1.9877 | 1.1500 |
| d21 | 1.7000 | 2.0393 | 1.7000 |
| d23 | 4.8308 | 8.9439 | 16.5218 |
| Entrance pupil position | 20.1706 | 19.2415 | 18.3453 |
| Exit pupil position | −39.9985 | −51.4394 | −71.3834 |
| Front principal point position | 26.4345 | 27.6821 | 29.8262 |
| Back principal point position | 89.2352 | 81.4889 | 77.6912 |

TABLE 22

(Lens element data)

| Unit | Initial surface No. | Focal length |
|---|---|---|
| 1 | 1 | −69.6856 |
| 2 | 3 | −54.2988 |
| 3 | 5 | −31.7123 |
| 4 | 7 | −31.5544 |
| 5 | 8 | 27.0070 |
| 6 | 10 | −18.4597 |
| 7 | 11 | 12.5859 |
| 8 | 14 | −23.7367 |
| 9 | 15 | 14.7927 |
| 10 | 17 | −10.1157 |
| 11 | 18 | 14.8816 |
| 12 | 20 | 25.4941 |
| 13 | 22 | −84.1001 |
| 14 | 24 | −56.3032 |
| 15 | 25 | 32.0423 |

TABLE 23

(Zoom lens unit data)

| Unit | Initial surface No. | Focal length | Length of lens unit | Front principal point position | Back principal point position |
|---|---|---|---|---|---|
| 1 | 1 | −14.24164 | 31.05430 | 9.85997 | 16.74252 |
| 2 | 10 | 44.08317 | 6.37420 | −1.41896 | 0.69708 |
| 3 | 14 | 21.93528 | 11.70240 | 8.51387 | 12.79729 |
| 4 | 22 | −84.10010 | 1.00000 | 1.56191 | 1.91263 |
| 5 | 24 | 69.44057 | 4.35500 | 4.15667 | 5.84080 |

TABLE 24

(Zoom lens unit magnification)

| Unit | Initial surface No. | Wide | Middle | Telephoto |
|---|---|---|---|---|
| 1 | 1 | 0.00000 | 0.00000 | 0.00000 |
| 2 | 10 | −44.20775 | 4.97181 | 2.86917 |
| 3 | 14 | 0.01098 | −0.12954 | −0.28937 |
| 4 | 22 | 1.30241 | 1.36019 | 1.45039 |
| 5 | 24 | 0.80002 | 0.79320 | 0.79313 |

Numerical Example 5

Figure 9:
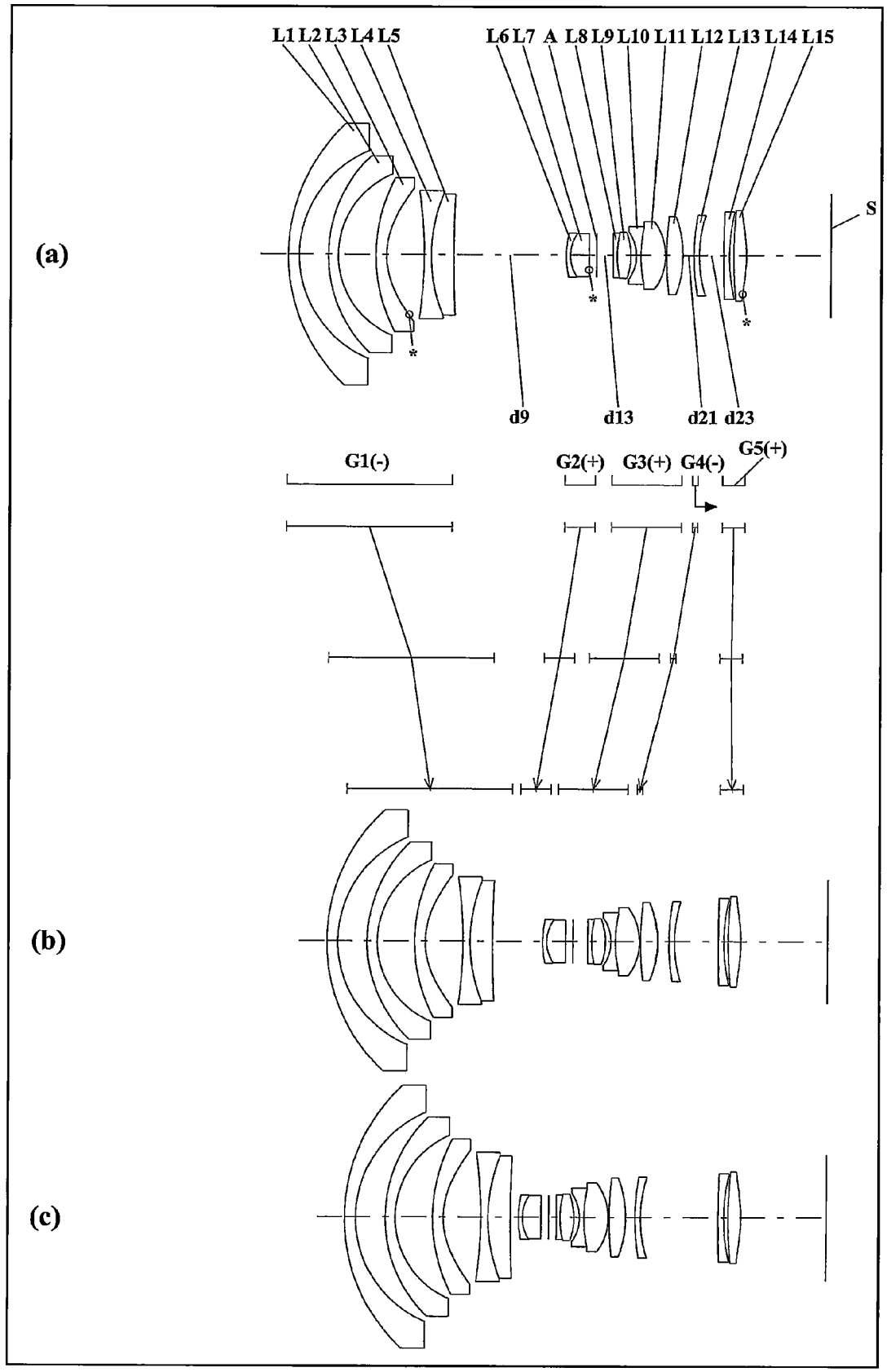
FIG. 9 is a lens arrangement diagram showing an infinity in-focus condition of a zoom lens system according to Embodiment 5 (Example 5)
Figure 10:
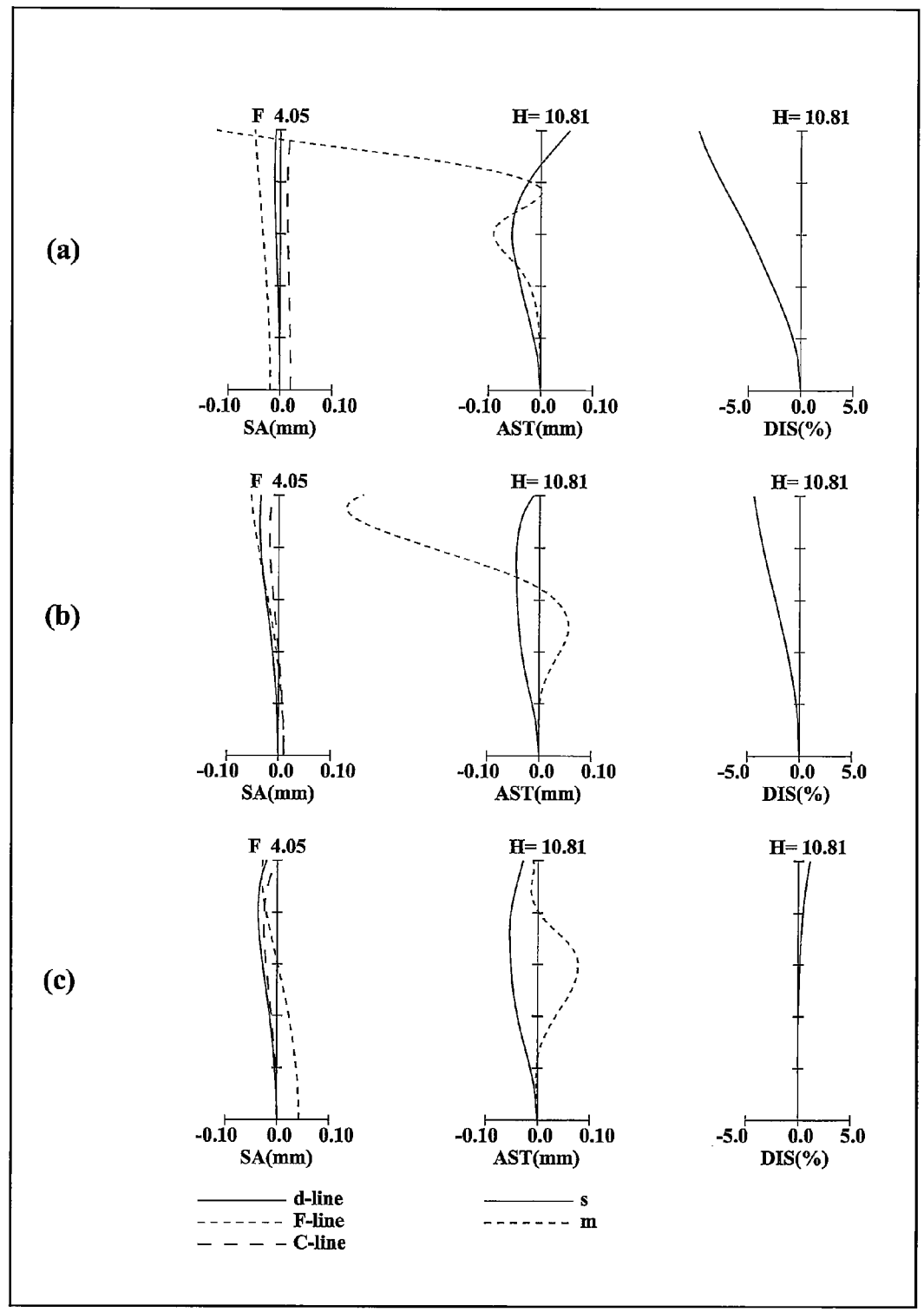
FIG. 10 is a longitudinal aberration diagram showing an infinity in-focus condition of a zoom lens system according to Example 5.

The zoom lens system of Numerical Example 5 corresponds to Embodiment 5 shown in FIG. 9. Data of the zoom lens system according to Numerical Example 5, i.e., the surface data, the aspherical data, the various data, the lens element data, the zoom lens unit data, and the zoom lens unit magnification are shown in Table 25, Table 26, Table 27, Table 28, Table 29, and Table 30, respectively.

TABLE 25

(Surface data)

| Surface number | r | d | nd | vd |
|---|---|---|---|---|
| Object surface | ∞ | | | |
| 1 | 32.53230 | 2.00000 | 1.80420 | 46.5 |
| 2 | 20.50000 | 5.29920 | | |
| 3 | 24.93130 | 1.80000 | 1.80420 | 46.5 |
| 4 | 16.00000 | 6.77330 | | |
| 5 | 30.03360 | 1.93360 | 1.80470 | 41.0 |
| 6* | 14.19960 | 6.83460 | | |
| 7 | −81.80750 | 1.29550 | 1.49700 | 81.6 |
| 8 | 29.31440 | 4.06670 | 1.80610 | 33.3 |
| 9 | 213.26320 | Variable | | |
| 10 | 19.05720 | 0.70000 | 1.72623 | 54.8 |
| 11 | 6.93710 | 3.42900 | 1.63182 | 34.7 |
| 12* | 696.48680 | 1.35570 | | |
| 13 (Diaphragm) | ∞ | Variable | | |
| 14 | −631.44520 | 0.70000 | 1.84666 | 23.8 |
| 15 | 17.41730 | 2.50600 | 1.53594 | 50.3 |
| 16 | −12.21090 | 1.02130 | | |
| 17 | −7.38790 | 0.80000 | 1.51742 | 52.1 |
| 18 | 24.34430 | 4.39930 | 1.49700 | 81.6 |
| 19 | −10.50450 | 0.20000 | | |
| 20 | 55.10800 | 3.00710 | 1.49700 | 81.6 |
| 21 | −19.57410 | Variable | | |
| 22 | 40.60470 | 1.00000 | 1.58144 | 40.9 |
| 23 | 23.96040 | Variable | | |
| 24 | 233.55820 | 1.00000 | 1.80518 | 25.5 |
| 25 | 34.11090 | 0.77000 | | |
| 26 | 79.43180 | 2.32080 | 1.52500 | 70.3 |
| 27* | −28.67840 | BF | | |
| Image surface | ∞ | | | |

TABLE 26

(Aspherical data)

| Surface No. | Parameters |
|---|---|
| 6 | K = 0.00000E+00, A4 = −4.43286E−05, A6 = −1.05536E−07, A8 = −2.37863E−09, A10 = 1.94014E−11, A12 = −8.16832E−14 |
| 12 | K = 0.00000E+00, A4 = −3.18703E−07, A6 = −1.05633E−06, A8 = −1.75650E−08, A10 = 0.00000E+00, A12 = 0.00000E+00 |
| 27 | K = 0.00000E+00, A4 = 6.73656E−05, A6 = 4.76084E−07, A8 = −6.30642E−09, A10 = 5.53166E−11, A12 = 0.00000E+00 |

TABLE 27

(Various data)
Zooming ratio 1.88916

| | Wide | Middle | Telephoto |
|---|---|---|---|
| Focal length | 7.2007 | 9.8948 | 13.6032 |
| F-number | 4.05157 | 4.05172 | 4.05114 |
| View angle | 59.0196 | 48.8263 | 38.1892 |
| Image height | 10.8150 | 10.8150 | 10.8150 |
| Overall length of lens system | 98.5596 | 90.7884 | 87.2555 |
| BF | 15.36996 | 15.68211 | 15.43608 |
| d9 | 20.5242 | 9.1837 | 1.4783 |
| d13 | 3.0469 | 2.6786 | 1.4085 |
| d21 | 1.9738 | 2.0576 | 1.7000 |
| d23 | 4.4326 | 7.9743 | 14.0205 |
| Entrance pupil position | 21.2510 | 20.1148 | 18.9129 |
| Exit pupil position | −42.7313 | −46.3055 | −48.8643 |
| Front principal point position | 27.5593 | 28.4301 | 29.6382 |
| Back principal point position | 91.3589 | 80.8936 | 73.6523 |

TABLE 28

(Lens element data)

| Unit | Initial surface No. | Focal length |
|---|---|---|
| 1 | 1 | −74.4367 |
| 2 | 3 | −61.0190 |
| 3 | 5 | −35.3977 |
| 4 | 7 | −43.2556 |
| 5 | 8 | 41.7491 |
| 6 | 10 | −15.3935 |
| 7 | 11 | 11.0686 |
| 8 | 14 | −20.0096 |
| 9 | 15 | 13.8012 |
| 10 | 17 | −10.8607 |
| 11 | 18 | 15.4108 |
| 12 | 20 | 29.4558 |
| 13 | 22 | −102.8018 |
| 14 | 24 | −49.7209 |
| 15 | 26 | 40.4334 |

TABLE 29

(Zoom lens unit data)

| Unit | Initial surface No. | Focal length | Length of lens unit | Front principal point position | Back principal point position |
|---|---|---|---|---|---|
| 1 | 1 | −14.95255 | 30.00290 | 10.49730 | 16.54644 |
| 2 | 10 | 41.90590 | 5.48470 | −0.32700 | 1.30559 |
| 3 | 14 | 20.56078 | 12.63370 | 9.79278 | 15.07317 |
| 4 | 22 | −102.80183 | 1.00000 | 1.57746 | 1.93084 |
| 5 | 24 | 181.29625 | 4.09080 | 8.72778 | 10.25289 |

TABLE 30

(Zoom lens unit magnification)

| Unit | Initial surface No. | Wide | Middle | Telephoto |
|---|---|---|---|---|
| 1 | 1 | 0.00000 | 0.00000 | 0.00000 |
| 2 | 10 | −6.25432 | 9.03108 | 3.39440 |
| 3 | 14 | 0.06686 | −0.06181 | −0.21607 |
| 4 | 22 | 1.21332 | 1.25115 | 1.30730 |
| 5 | 24 | 0.94921 | 0.94749 | 0.94885 |

Numerical Example 6

Figure 11:
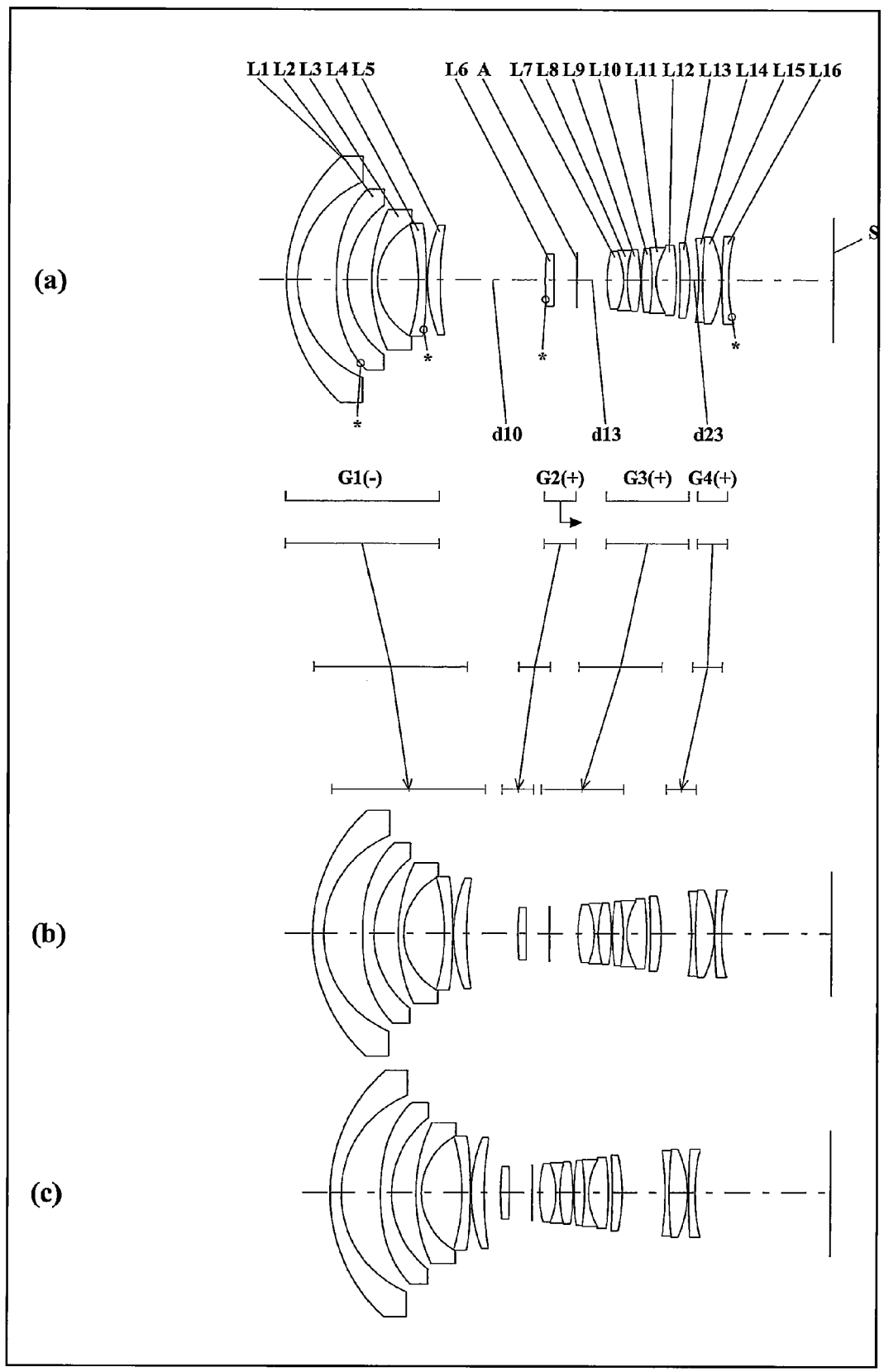
FIG. 11 is a lens arrangement diagram showing an infinity in-focus condition of a zoom lens system according to Embodiment 6 (Example 6)
Figure 12:
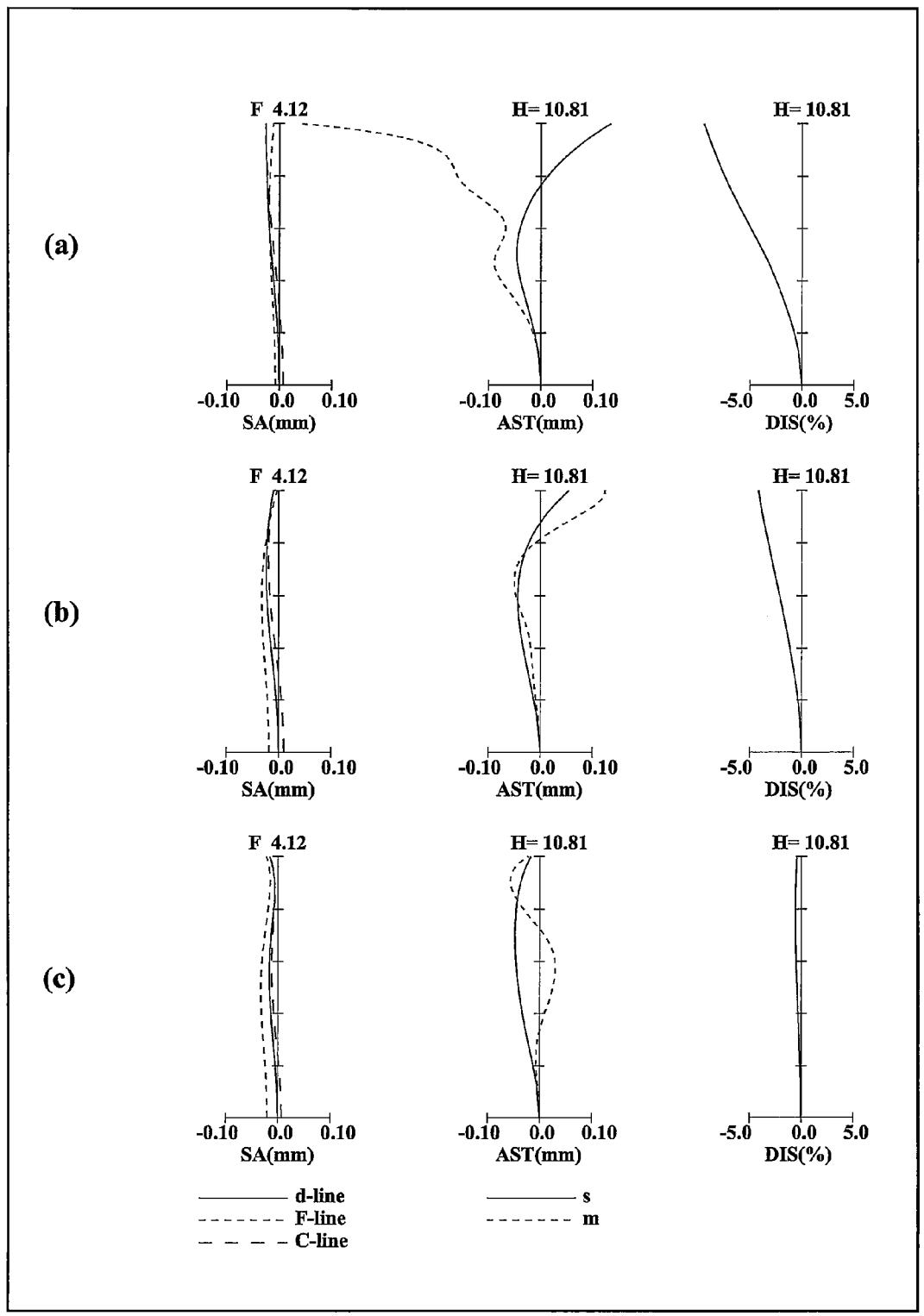
FIG. 12 is a longitudinal aberration diagram showing an infinity in-focus condition of a zoom lens system according to Example 6.

The zoom lens system of Numerical Example 6 corresponds to Embodiment 6 shown in FIG. 11. Data of the zoom lens system according to Numerical Example 6, i.e., the surface data, the aspherical data, the various data, the lens element data, the zoom lens unit data, and the zoom lens unit magnification are shown in Table 31, Table 32, Table 33, Table 34, Table 35, and Table 36, respectively.

TABLE 31

(Surface data)

| Surface number | r | d | nd | vd |
|---|---|---|---|---|
| Object surface | ∞ | | | |
| 1 | 30.26100 | 2.00000 | 1.80420 | 46.5 |
| 2 | 19.23600 | 7.05290 | | |
| 3* | 43.33240 | 2.00000 | 1.80470 | 41.0 |
| 4 | 17.35190 | 4.41100 | | |
| 5 | 30.05900 | 1.00000 | 1.80420 | 46.5 |
| 6 | 11.70510 | 7.37650 | | |
| 7 | −36.01870 | 1.50000 | 1.60602 | 57.4 |
| 8* | −132.95950 | 0.20000 | | |
| 9 | 26.63140 | 2.31620 | 1.92286 | 20.9 |
| 10 | 57.60560 | Variable | | |
| 11* | 50.16330 | 1.55520 | 1.68400 | 31.3 |
| 12 | −748.57270 | 4.22080 | | |
| 13 (Diaphragm) | ∞ | Variable | | |
| 14 | 21.62730 | 2.96530 | 1.55920 | 53.9 |
| 15 | −13.58820 | 0.70000 | 1.80610 | 33.3 |
| 16 | 21.60250 | 2.41110 | 1.84666 | 23.8 |
| 17 | −29.87500 | 0.15000 | | |
| 18 | 36.46530 | 1.95480 | 1.49700 | 81.6 |
| 19 | −40.39410 | 0.70000 | 1.80610 | 33.3 |
| 20 | 11.75980 | 3.61880 | 1.49700 | 81.6 |
| 21 | −50.54280 | 0.68720 | | |
| 22 | −137.65940 | 1.81280 | 1.58913 | 61.3 |
| 23 | −31.54950 | Variable | | |
| 24 | −52.47270 | 0.70000 | 1.75520 | 27.5 |
| 25 | 75.52100 | 3.36870 | 1.56384 | 60.8 |
| 26 | −18.57000 | 0.15000 | | |
| 27 | 106.05390 | 1.20000 | 1.80470 | 41.0 |
| 28* | 43.21760 | BF | | |
| Image surface | ∞ | | | |

TABLE 32

(Aspherical data)

| Surface No. | Parameters |
|---|---|
| 3 | K = 0.00000E+00, A4 = 3.85974E−05, A6 = −5.79936E−08, A8 = −1.32058E−11, A10 = 1.06809E−12, A12 = −2.06927E−15 |
| 8 | K = 0.00000E+00, A4 = 1.93728E−06, A6 = −3.18981E−07, A8 = 1.51649E−09, A10 = 8.06356E−13, A12 = −1.02174E−13 |
| 11 | K = 0.00000E+00, A4 = −1.75155E−05, A6 = −2.03856E−07, A8 = 7.42728E−09, A10 = 0.00000E+00, A12 = 0.00000E+00 |
| 28 | K = 0.00000E+00, A4 = 4.70983E−05, A6 = 3.70787E−07, A8 = −1.10328E−08, A10 = 2.06027E−10, A12 = −1.42704E−12 |

TABLE 33

(Various data)
Zooming ratio 1.94367

| | Wide | Middle | Telephoto |
|---|---|---|---|
| Focal length | 7.1000 | 9.7001 | 13.8001 |
| F-number | 4.12083 | 4.12002 | 4.12038 |
| View angle | 59.2702 | 49.3156 | 38.2059 |
| Image height | 10.8150 | 10.8150 | 10.8150 |
| Overall length of lens system | 99.4483 | 94.2036 | 90.8131 |
| BF | 19.16608 | 20.01519 | 24.61319 |
| d10 | 19.1587 | 9.3837 | 3.0374 |
| d13 | 5.5000 | 5.1916 | 1.3500 |
| d23 | 1.5722 | 5.5618 | 7.7612 |
| Entrance pupil position | 18.7937 | 18.1050 | 17.4533 |
| Exit pupil position | −31.6025 | −35.7750 | −28.4490 |
| Front principal point position | 24.9008 | 26.1185 | 27.6644 |
| Back principal point position | 92.3482 | 84.5035 | 77.0130 |

TABLE 34

(Lens element data)

| Unit | Initial surface No. | Focal length |
|---|---|---|
| 1 | 1 | −71.4288 |
| 2 | 3 | −37.2432 |
| 3 | 5 | −24.4306 |
| 4 | 7 | −81.9968 |
| 5 | 9 | 51.8095 |
| 6 | 11 | 68.7867 |
| 7 | 14 | 15.3881 |
| 8 | 15 | −10.2568 |
| 9 | 16 | 15.1325 |
| 10 | 18 | 38.8892 |
| 11 | 19 | −11.2318 |
| 12 | 20 | 19.5729 |
| 13 | 22 | 69.0383 |
| 14 | 24 | −40.9006 |
| 15 | 25 | 26.7805 |
| 16 | 27 | −91.4233 |

TABLE 35

(Zoom lens unit data)

| Unit | Initial surface No. | Focal length | Length of lens unit | Front principal point position | Back principal point position |
|---|---|---|---|---|---|
| 1 | 1 | −12.26575 | 27.85660 | 9.45738 | 13.47547 |
| 2 | 11 | 68.78668 | 5.77600 | 0.05805 | 0.68900 |
| 3 | 14 | 25.57225 | 15.00000 | 4.32045 | 8.58711 |
| 4 | 24 | 284.84450 | 5.41870 | 10.16158 | 12.54028 |

TABLE 36

(Zoom lens unit magnification)

| Unit | Initial surface No. | Wide | Middle | Telephoto |
|---|---|---|---|---|
| 1 | 1 | 0.00000 | 0.00000 | 0.00000 |
| 2 | 11 | 3.00077 | 2.10369 | 1.76176 |
| 3 | 14 | −0.20142 | −0.39374 | −0.68040 |
| 4 | 24 | 0.95772 | 0.95473 | 0.93859 |

The following Tables 37 and 38 show values corresponding to the individual conditions in the zoom lens systems of the respective numerical examples.

TABLE 37

(Corresponding values to individual conditions: Numerical Examples 1-4)

| Condition | Numerical Example | | | |
|---|---|---|---|---|
| | 1 | 2 | 3 | 4 |
| (1) $f_W/f_1$ | −0.483 | −0.484 | −0.500 | −0.506 |
| (2) $f_W/f_2$ | 0.177 | 0.170 | 0.192 | 0.163 |
| (3) $f_W/f_3$ | 0.320 | 0.322 | 0.317 | 0.328 |
| (4) $f_W/f_4$ | −0.071 | −0.071 | −0.077 | −0.086 |
| (5) $f_W/f_5$ | 0.089 | 0.090 | 0.106 | 0.104 |
| (6) $DIS_W$ | −9.81 | −10.44 | −9.50 | −9.74 |
| (7) $(R_{11}+R_{12})/(R_{11}-R_{12})$ | 4.184 | 4.221 | 4.262 | 4.099 |
| (8) $(R_{21}+R_{22})/(R_{21}-R_{22})$ | 3.750 | 3.755 | 3.900 | 4.017 |
| (9) $(R_{31}+R_{32})/(R_{31}-R_{32})$ | 3.535 | 3.522 | 3.506 | 3.402 |
| (10) DL/YM | 1.658 | 1.636 | 1.650 | 1.597 |
| (11) $BF_W/YM$ | 1.422 | 1.423 | 1.422 | 1.421 |
| $2\omega_W(°)$ | 118.03 | 118.35 | 117.85 | 118.00 |

TABLE 38

(Corresponding values to individual conditions: Numerical Examples 5 and 6)

| Condition | Numerical Example | |
|---|---|---|
| | 5 | 6 |
| (1) $f_W/f_1$ | −0.482 | −0.579 |
| (2) $f_W/f_2$ | 0.172 | 0.103 |
| (3) $f_W/f_3$ | 0.350 | 0.278 |
| (4) $f_W/f_4$ | −0.070 | 0.025 |
| (5) $f_W/f_5$ | 0.040 | — |
| (6) $DIS_W$ | −9.82 | −9.45 |
| (7) $(R_{11}+R_{12})/(R_{11}-R_{12})$ | 4.407 | 4.490 |
| (8) $(R_{21}+R_{22})/(R_{21}-R_{22})$ | 4.583 | 2.336 |
| (9) $(R_{31}+R_{32})/(R_{31}-R_{32})$ | 2.794 | 2.275 |
| (10) DL/YM | 1.444 | 1.368 |
| (11) $BF_W/YM$ | 1.421 | 1.772 |
| $2\omega_W(°)$ | 118.04 | 118.54 |

The zoom lens system according to the present invention is applicable to a digital input device such as a digital still camera, a digital video camera, a mobile telephone, a PDA (Personal Digital Assistance), a surveillance camera in a surveillance system, a Web camera or a vehicle-mounted camera. In particular, the present zoom lens system is suitable for an imaging device in a digital still camera, a digital video camera or the like that requires high image quality.

While the invention has been described in detail, the foregoing description is in all aspects illustrative and not restrictive. It is understood that numerous other modifications and variations can be devised without departing from the scope of the invention.

What is claimed is:

1. A zoom lens system comprising a plurality of lens units and performing zooming by changing intervals among the lens units, wherein
the plurality of lens units, in order from an object side to an image side, includes:
a first lens unit having negative optical power;
a second lens unit having positive optical power;
a third lens unit having positive optical power; and
a fourth lens, and
the following conditions are satisfied:

$$1.4 < DL/YM < 2.5 \qquad (10)$$

$$1.2 < BF_W/YM < 1.6 \qquad (11)$$

(where, $100 < 2\omega_W < 140$)
where,
DL is an effective diameter of the lens surface closest to the image side,
$BF_W$ is the back focus at a wide-angle limit,
YM is the maximum image height at a wide-angle limit, and
$\omega_W$ is a half view angle (°) at a wide-angle limit.

2. The zoom lens system as claimed in claim 1, wherein
the fourth lens unit has negative optical power,
the zoom lens system further comprises a fifth lens unit having positive optical power and arranged relative to the fourth lens unit, and
at the time of zooming, the fifth lens unit is fixed.

3. The zoom lens system as claimed in claim 1, satisfying the following condition:

$$DIS_W < -8 \qquad (6)$$

where,
$DIS_W$ is distortion (%) at a maximum image height at a wide-angle limit.

4. The zoom lens system as claimed in claim 1, satisfying the following condition:

$$0.1 < f_W/f_2 < 0.3 \qquad (2)$$

where,
$f_2$ is a focal length of the second lens unit, and
$f_W$ is a focal length of an entire system at a wide-angle limit.

5. The zoom lens system as claimed in claim 1, satisfying the following condition:

$$0.25 < f_W/f_3 < 0.5 \quad (3)$$

where,
$f_3$ is a focal length of the third lens unit, and
$f_W$ is a focal length of an entire system at a wide-angle limit.

6. The zoom lens system as claimed in claim 1, satisfying the following condition:

$$-0.1 < f_W/f_4 < -0.05 \quad (4)$$

where,
$f_4$ is a focal length of the fourth lens unit, and
$f_W$ is a focal length of an entire system at a wide-angle limit.

7. The zoom lens system as claimed in claim 1, satisfying the following condition:

$$-0.65 < f_W/f_1 < -0.45 \quad (1)$$

where,
$f_1$ is a focal length of the first lens unit, and
$f_W$ is a focal length of an entire system at a wide-angle limit.

8. The zoom lens system as claimed in claim 7, satisfying the following condition:

$$0.01 < f_W/f_5 < 0.15 \quad (5)$$

where,
$f_5$ is a focal length of the fifth lens unit, and
$f_W$ is a focal length of an entire system at a wide-angle limit.

9. An interchangeable lens apparatus, comprising:
a zoom lens system including a plurality of lens and performing zooming by changing intervals among the lens units; and
a mount section connected to a camera body that includes an image sensor which receives an optical image formed by the zoom lens system thereby to convert the optical image to an electrical image signal, wherein
the plurality of lens units, in order from an object side to an image side, includes:
a first lens unit having negative optical power;
a second lens unit having positive optical power;
a third lens unit having positive optical power; and
a fourth lens, and
the following conditions are satisfied:

$$1.4 < DL/YM < 2.5 \quad (10)$$

$$1.2 < BF_W/YM < 1.6 \quad (11)$$

(where, $100 < 2\omega_W < 140$)
where,
DL is an effective diameter of the lens surface closest to the image side,
$BF_W$ is the back focus at a wide-angle limit,
YM is the maximum image height at a wide-angle limit, and
$\omega_W$ is a half view angle (°) at a wide-angle limit.

10. A camera system, comprising:
an interchangeable lens apparatus that includes a zoom lens system including a plurality of lens units and performing zooming by changing intervals among the lens units; and
a camera body which is connected to the interchangeable lens apparatus via a camera mount section in an attachable and removable manner and includes an image sensor which receives an optical image formed by the zoom lens system thereby to convert the optical image to an electrical image signal, wherein
the plurality of lens units, in order from an object side to an image side, includes:
a first lens unit having negative optical power;
a second lens unit having positive optical power;
a third lens unit having positive optical power; and
a fourth lens, and
the following conditions are satisfied:

$$1.4 < DL/YM < 2.5 \quad (10)$$

$$1.2 < BF_W/YM < 1.6 \quad (11)$$

(where, $100 < 2\omega_W < 140$)
where,
DL is an effective diameter of the lens surface closest to the image side,
$BF_W$ is the back focus at a wide-angle limit,
YM is the maximum image height at a wide-angle limit, and
$\omega_W$ is a half view angle (°) at a wide-angle limit.

* * * * *